United States Patent
Lee et al.

(10) Patent No.: US 10,972,670 B2
(45) Date of Patent: Apr. 6, 2021

(54) CONTENT DISPLAY METHOD AND ELECTRONIC DEVICE FOR IMPLEMENTING SAME

(71) Applicant: Samsung Electronics Co., Ltd., Suwon-si (KR)

(72) Inventors: Yongyeon Lee, Suwon-si (KR); Yunkyung Kim, Suwon-si (KR); Jiyeon Kwak, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 2 days.

(21) Appl. No.: 15/774,148

(22) PCT Filed: Oct. 31, 2016

(86) PCT No.: PCT/KR2016/012385
§ 371 (c)(1),
(2) Date: May 7, 2018

(87) PCT Pub. No.: WO2017/078350
PCT Pub. Date: May 11, 2017

(65) Prior Publication Data
US 2018/0332233 A1    Nov. 15, 2018

(30) Foreign Application Priority Data
Nov. 6, 2015 (KR) ......... 10-2015-0155556

(51) Int. Cl.
*H04N 5/232* (2006.01)
*G06F 3/0488* (2013.01)
(Continued)

(52) U.S. Cl.
CPC ....... *H04N 5/232935* (2018.08); *G06F 3/048* (2013.01); *G06F 3/0482* (2013.01);
(Continued)

(58) Field of Classification Search
CPC ....... H04N 5/232935; H04N 5/232945; H04N 5/23218; H04N 5/2628
See application file for complete search history.

(56) References Cited

U.S. PATENT DOCUMENTS 6,556,195 B1 *   4/2003   Totsuka ............. G06T 15/04
                                                    345/419
10,674,075 B2    6/2020   Kimura
(Continued)

FOREIGN PATENT DOCUMENTS

CN    102053781 A    5/2011
CN    103079035 A    5/2013
(Continued)

OTHER PUBLICATIONS

Anonymous, "How to change an image from Cartesian to Polar coordinates in Matlab?", May 23, 2011, https://stackoverflow.com/questions/7580623/how-to-change-an-image-from-cartesian-to-polar-coordinates-in-matlab.
(Continued)

*Primary Examiner* — Twyler L Haskins
*Assistant Examiner* — Fayez A Bhuiyan
(74) *Attorney, Agent, or Firm* — Jefferson IP Law, LLP

(57) ABSTRACT

Various embodiment provide a method and device comprising: a display; a memory; and a control unit operatively connected to the display and the memory, wherein the control unit is configured to control the display to display an original image on the display, detect a roll generation event, identify an object from the original image according to the roll generation event, convert the original image into a roll image using the identified object, and store the same in the memory. In addition, other embodiments are also possible.

20 Claims, 26 Drawing Sheets

(51) Int. Cl.
    *G06F 3/048*     (2013.01)
    *G06F 3/0481*     (2013.01)
    *G06T 11/00*     (2006.01)
    *G06F 3/0482*     (2013.01)
    *G06F 16/904*     (2019.01)
    *H04N 5/262*     (2006.01)

(52) U.S. Cl.
    CPC ........ *G06F 3/0488* (2013.01); *G06F 3/04817* (2013.01); *G06F 16/904* (2019.01); *G06T 11/00* (2013.01); *H04N 5/23218* (2018.08); *H04N 5/232945* (2018.08); *H04N 5/2628* (2013.01)

(56) References Cited

U.S. PATENT DOCUMENTS

| | | | |
|---|---|---|---|
| 2007/0103544 A1 | 5/2007 | Nakazawa | |
| 2011/0096089 A1 | 4/2011 | Shenhav et al. | |
| 2011/0105192 A1 | 5/2011 | Jung et al. | |
| 2012/0293607 A1 | 11/2012 | Bhogal et al. | |
| 2014/0176600 A1* | 6/2014 | Lee | G06T 3/40 345/625 |
| 2014/0267593 A1 | 9/2014 | Kim et al. | |
| 2014/0313224 A1 | 10/2014 | Ohki et al. | |
| 2014/0375760 A1 | 12/2014 | Lee et al. | |
| 2015/0212702 A1 | 7/2015 | Kim et al. | |
| 2016/0080647 A1* | 3/2016 | Kimura | H04N 1/3876 348/36 |

FOREIGN PATENT DOCUMENTS

| | | |
|---|---|---|
| CN | 103426202 A | 12/2013 |
| EP | 2 960 856 A1 | 12/2015 |
| KR | 10-2011-0048892 A | 5/2011 |
| KR | 10-2014-0147597 A | 12/2014 |
| KR | 10-2015-0090740 A | 8/2015 |
| WO | 2014/178235 A1 | 11/2014 |

OTHER PUBLICATIONS

European Office Action dated Sep. 19, 2018; Reference No. P255303EP/NKI; Application No. 16862366.8.
Chinese Office Action dated Aug. 28, 2020, issued in Chinese Application No. 201680064706.1.
Indian Office Action dated Oct. 5, 2020, issued in Indian Application No. 201817019159.
European Office Action dated Dec. 3, 2020, issued in European Application No. 16 862 366.8.

* cited by examiner

CONTENT DISPLAY METHOD AND ELECTRONIC DEVICE FOR IMPLEMENTING SAME

TECHNICAL FIELD

Various embodiments relate to a contents display method and an electronic device for implementing the method.

BACKGROUND ART

With development of the digital technology, various electronic devices that can perform communication and process personal information while moving such as a mobile communication terminal, a Personal Digital Assistant (PDA), an electronic notebook, a smartphone, a tablet Personal Computer (PC), and a wearable device have been put on the market. As these electronic devices are varied in sizes and improved in performance, they can display various contents with various sizes in various ways. For example, when contents cannot be not fully displayed at a time, electronic devices display only a portion of the contents. Alternatively, electronic devices set the number of contents to display at one time on the basis of the sizes of the contents and display the set number of contents.

DETAILED DESCRIPTION OF THE INVENTION

Technical Problem

Contents having sizes that are larger than the display areas of electronic devices are increased, and when those contents are displayed, only a portion of the contents is displayed in the related art. For example, when an image list including a plurality of wide panoramic images are provided, electronic devices display only a portion of the panoramic images. In this case, a user cannot check the entire area of the panoramic images and checks only the portion, so he/she may have difficulty to identify the panoramic images. Alternatively, when displaying the entire area of the panoramic images of the image list, electronic devices display fewer panoramic images than the number of common images because the panoramic images are wider than common images. In this case, since the number of panoramic images that can be checked at a time is small, a user has to scroll several times to find out desired images.

Various embodiments can provide a method and device for converting and displaying an image into a spherical roll image in response to a request from a user.

Various embodiments can provide a method and device that can convert and display an image into a spherical roll image on the basis of metadata of contents.

Technical Solution

An electronic device according to various embodiments includes a display, a memory, and a controller operatively connected with the display and the memory, in which the controller may be configured to control the display to display an original image, detect a roll creation event, identify an object from the original image in accordance with the roll creation event, convert the original image into a roll image, using the identified object, and stores the roll image in the memory.

A method of displaying contents of an electronic device according to various embodiments may include: an operation of displaying an original image on a display; an operation of detecting a roll creation event; an operation of identifying objects from the original image in accordance with the roll creation event; and an operation of converting the original image into a roll image, using the identified objects.

A computer-readable recording medium according to various embodiments may include a program for performing: an operation of displaying an original image on a display; an operation of detecting a roll creation event; an operation of identifying objects from the original image in accordance with the roll creation event; and an operation of converting the original image into a roll image, using the identified objects.

Advantageous Effects

According to various embodiments, it is possible to display a large number of images at one time by converting an image wider than common images into a spherical roll image.

Various embodiments can more vary the method of displaying information by displaying a spherical roll image on the basis of metadata of contents.

Various embodiments can propose a new method of processing images by creating various roll images on the basis of the properties of contents.

Various embodiments can make it easy for a user to recognize images by displaying the entire area of an image in a spherical shape even without additional input by the user.

MODE FOR CARRYING OUT THE INVENTION

Figure 1:
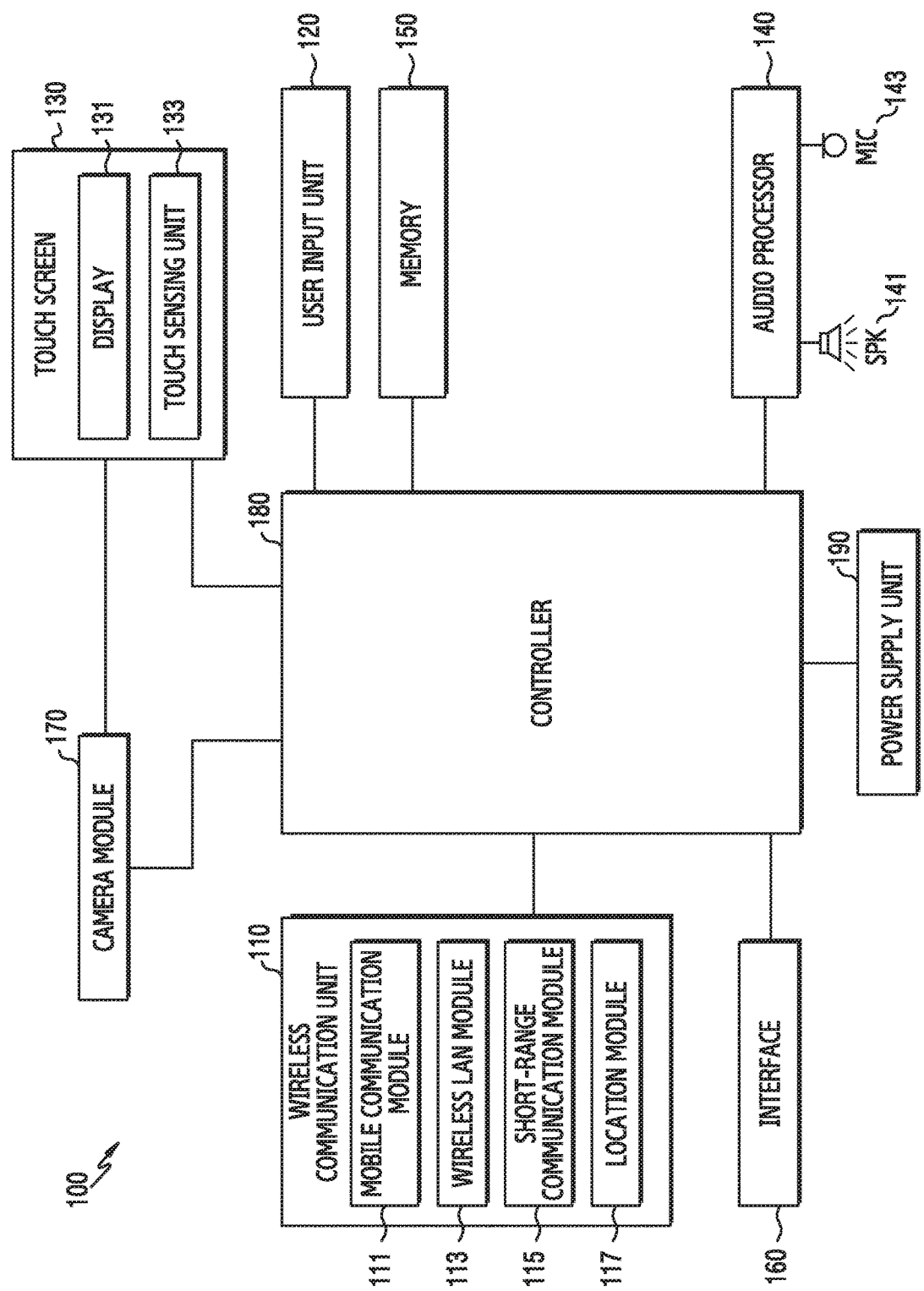
FIG. 1 is a block diagram showing the configuration of an electronic device according to various embodiments.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

According to an embodiment of the present disclosure, the electronic device may include all devices using one or more of all information and communication devices, a multimedia device, and a wearable device that support functions (for example, display functions) according to various embodiments of the present disclosure, and various processors such as an application device thereof, including an Application Processor (AP), a Graphic Processing Unit (GPU), and a Central Processing Unit (CPU).

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a smart glasses, a head-mounted-device (HMD) etc.), or a smart watch).

Further, in embodiments of the present disclosure, the electronic device may include a smart home appliance. The home appliance may include at least one of, for example, a television, a Digital Video Disk (DVD) player, a refrigerator, an air conditioner, a vacuum cleaner, a washing machine, a set-top box, a home automation control panel, a TV box (e.g., Samsung HomeSync™, Apple TV', or Google TV™), a game console (e.g., Xbox™ and PlayStation™), and an electronic photo frame. Further, in embodiments of the present disclosure, the electronic device may include at least one of a navigation device and an Internet of things (IoT) device.

The electronic device according to various embodiments of the present disclosure may be a combination of one or more of the aforementioned various devices. The electronic device according to some embodiments of the present disclosure may be a flexible device. Further, the electronic device according to an embodiment of the present disclosure is not limited to the aforementioned devices, and may include a new electronic device according to the development of technology The term "user" as used in various embodiments of the present disclosure may refer to a person who uses an electronic device or a device (e.g., artificial intelligence electronic device) that uses an electronic device. In embodiments of the present disclosure, a module or programming module may include at least one of various elements of the present disclosure, exclude some of the elements, or may further include other additional elements. The operations performed by the modules, programming module, or other elements according to various embodiments of the present disclosure may be executed in a sequential, parallel, repetitive, or heuristic manner. Furthermore, some operations may be executed in a different order or may be omitted, or other operations may be added.

Hereinafter, a method and device for displaying contents according to an embodiment are described with reference to the accompanying drawings. However, since the various embodiments are not restricted or limited by the following description, it should be noted that applications can be made to the various embodiments based on embodiments that will be described below. Hereinafter, various embodiments of the present disclosure will be described based on an approach of hardware. However, various embodiments of the present disclosure include a technology that uses both hardware and software and thus, the various embodiments of the present disclosure may not exclude the perspective of software.

FIG. 1 is a block diagram showing the configuration of an electronic device according to various embodiments.

Referring to FIG. 1, an electronic device 100 according to various embodiments may include a wireless communication unit 110, a user input unit 120, a touch screen 130, an audio processor 140, a memory 150, an interface 160, a camera module 170, a controller 180, and a power supply unit 190. The electronic device 100 according to various embodiments does not necessarily include the components shown in FIG. 1, so it may be configured to include more or less components than those shown in FIG. 1.

The wireless communication unit 110 may include one or more modules that enable wireless communication between the electronic device 100 and other external electronic devices. In various embodiments, the wireless communication unit 110 may include a module (for example, a short-range communication module and a remote communication module) for performing communication with external electronic devices. For example, the wireless communication unit 110 may include a mobile communication module 111, a Wireless Local Area Network (WLAN) module 113, a short-range communication module 115, a location module 117 etc.

The mobile communication module 111 can transmit/receive wireless signals to/from at least one of a base station, an external electronic device, and various servers (for example, an integration server, a provider server, a content server, an internet server, or a cloud server) on a mobile communication network. The wireless signals may include a voice signal, a data signal, or various formats of control signals. The mobile communication module 111 can transmit various data for operation of the electronic device 100 to an external device (for example, a server or another electronic device) in response to a request from a user. In various embodiments, the mobile communication module 111 can transmit/receive wireless signals on the basis of various communication methods. For example, the communication methods, though not limited thereto, may include, Long-Term Evolution (LTE), LTE Advance (LTE-A), Global System for Mobile communication (GSM), Enhanced Data GSM Environment (EDGE), Code Division Multiple Access (CDMA), (Wideband CDMA (WCDMA), Universal Mobile Telecommunications System (UMTS), or Orthogonal Frequency Division Multiple access (OFDMA).

The WLAN module 113 may be a module for wirelessly accessing the internet or forming a wireless LAN link with another external electronic device. The WLAN module 113 may be disposed inside or outside the electronic device 100. Wireless Fidelity (WiFi), Wireless broadband (Wibro), World interoperability for Microwave Access (WiMax), High Speed Downlink Packet Access (HSDPA), or millimeter Wave (mmWave) may be used for the wireless internet technology. The WLAN module 113 can transmit or receive various data of the electronic device 100 to or from the outside (for example, an external electronic device or server) in combination with another external electronic device connected with the electronic device 100 through a network (for example, a wireless internet network). The WLAN module 113 may always keep turned on or may be turned on in accordance with setting of the electronic device 100 or input from a user.

The short-range communication module 115 may be a module for performing short range communication. Bluetooth, Bluetooth Low Energy (BLE), Radio Frequency IdentificationI (RFID), Infrared Data Association (IrDA), Ultra Wideband (UWB), Zigbee, or Near Field Communication (NFC) may be used for the short-range communication technology. The short-range communication module 115 can transmit or receive various data of the electronic device 100 to or from another external electronic device (for example, an external sound device) connected with the electronic device 100 through a network (for example, a short-range communication network) in combination with the external electronic device. The short-range communication module 115 may always keep turned on or may be turned on in accordance with setting of the electronic device 100 or input from a user.

The location module 117 is a module for obtaining the location of the electronic device 100 and may include a Global Position System (GPS) as a representative example. The location module 115 can measure the location of the electronic device 100, using the triangulation principle. For example, the location module 117 can calculate 3D current location information according to the latitude, longitude, and altitude by calculating information about distances from three or more base station and information about time and then applying trigonometry to the calculated information. Alternatively, the location module 117 can calculate location information by continuously receiving in real time location information of the electronic device from three or more satellites. The location information of the electronic device 100 can be obtained by various methods.

The user input unit 120 generates input data for controlling the operation of the electronic device 100 in response to input from a user. The user input unit 120 may include at least one input element for detecting various inputs from a user. For example, the user input unit 120 may include a keypad, a dome switch, a physical button, a touchpad (static pressure/static electricity), a jog & shuttle, a sensor module, etc.

The user input unit 120 may be implemented partially in a button type outside the electronic device 100 or may be implemented partially or entirely as a touch panel. The user input unit 120 can receive input from a user for initiating an operation (for example, a function of creating a roll image) of the electronic device 100 according to various embodiments and can generate an input signal according to input from a user.

The sensor module, for example, can measure physical quantities or sense operation states of the electronic device 100 and can convert the measured or sensed information into electrical signals. The sensor module, for example, may include at least one of a gesture sensor, a gyro sensor, an atmospheric sensor, a magnetic sensor, an acceleration sensor, a grip sensor, a proximity sensor, a color sensor (for example, RGB (red, green, blue) sensor), a biometric sensor, a temperature/humidity sensor, a light sensor, and an UV (ultraviolet) sensor. Further or alternatively, the sensor module, for example, may include an e-nose sensor, an Electromyography (EMG) sensor, an Electroencephalogram (EEG) sensor, an Electro-cardiogram (ECG) sensor, an Infrared (IR) sensor, an iris sensor, and/or a fingerprint sensor. The sensor module may further include a control circuit for controlling one or more sensors therein. In an embodiment, the electronic device 100 may further include a processor configured to control the sensor module as a part of the controller 180 or an independent component, so it is possible to control the sensor module while the control unit 180 is in a sleep state.

The touch screen 130 is an I/O device that can perform both of an input function and a display function and may include a display 131 and a touch sensing unit 133. The touch screen 130 can provide an I/O interface between the electronic device 100 and a user and transmit a touch input by the user to the electronic device 100, and it may have a medium function that shows output from the electronic device 100 to the user. The touch screen 130 can show visual output to a user. The visual output may be implemented as text, a graphic, a video, and a combination of them. The touch screen 130 according to an embodiment can display various images according to the operation of the electronic device 100 through the display 131. While displaying a specific image through the display 131, the touch screen 130 can sense events (for example, a touch event, an approach event, a hovering event, and an air gesture event) based on at least one of touch, hovering, and an air gesture from a user through the touch sensing unit 133, and transmit input signals according to the events to the controller 180.

According to various embodiments, the display 131 can display (output) various items of information to be processed by the electronic device 100. For example, the display 131 can display an action that displays an original image, an action that displays a roll image, and a user interface or a Graphical User Interface (GUI).

The display 131 can support an image display of a transverse mode, an image display of a longitudinal mode, or an image display according to a change between the transverse mode and the longitudinal mode, depending on the rotational direction (or the placed direction) of the electronic device 100. Various displays may be used as the display 131. The display 131 may be a bended display in various embodiments. For example, the display 131 may include a bended display that can be curved, bended, or rolled without damage, using a thin and flexible substrate like paper.

The bended display can be fastened to a housing (for example, a main body) and keep a bended shape. In various embodiments, the electronic device 100 may be implemented as a display device that can be freely bent and unbent such as a flexible display, including the bended display. In various embodiments, it is possible to give flexibility for bending and unbending to the display 131 by replacing the glass substrate containing liquid crystals with plastic film in a Liquid Crystal Display (LCD), a Light Emitting Diode (LED) display, and Organic LED (OLED) display, an Active Matrix OLED (AMOLED) display, or an electronic paper. In various embodiments, the display 131 may be extended and fastened to at least one side (for example, at least one of the left side, the right side, the top, and the bottom) of the electronic device 100.

The touch sensing unit 133 may be disposed on the display 131 and can sense input from a user touching or approaching the surface of the touch screen 130. The touch sensing unit 133, in an embodiment, can receive user input for starting an operation related to using the electronic device 100 and generates an input signal according to the user input. The user input may include a touch event or an approach event that is input on the basis of at least one of single-touch, multi-touch, hovering, and an air gesture. For example, user input may be inputted by tap, drag, sweep, swipe, flick, drag & drop, or a drawing gesture (for example, writing).

The audio processor 140 can transmit an audio signal input from the controller 180 to a speaker (SPK) 141 and transmit an audio signal such as a voice input from a microphone (MIC) 143 to the controller 180. The audio processor 140 can be controlled by the controller 180 to convert and output voice/sound data into an audible sound through the speaker 141, and convert an audio signal such as a voice received from the microphone 143 into a digital signal and transmit the digital signal to the controller 180. The audio processor 140 can output an audio signal responding to user input in accordance with audio processing information (for example, an effect sound and a music file) inserted in data.

The speaker 141 can output audio data received from the wireless communication unit 110 or stored in a memory 150. The speaker 141 may output sound signals related to various operations (functions) that are performed in the electronic device 100. Though not shown in the embodiment, an attachable and detachable earphone, headphone, or headset may be connected to the speaker 141 of the electronic device 100 through an external port.

The microphone 143 can receive external sound signals and process the external sound signals into electrical voice data. Various noise reduction algorithms for removing noise that is generated in the process of receiving sound signals from the outside may by implemented in the microphone 143. The microphone 143 may be in charge of inputting audio streams such as voice commands (for example, a voice command for starting a music application). The microphone 143 may include a built-in microphone disposed in the electronic device or an external microphone connected to the electronic device 100.

The memory 150 can store one or more programs that are executed by the controller 180 and can also temporarily store input/output data. The input/output data, for example, may include moving picture, image, photograph, and audio files. The memory 150 is in charge of storing obtained data, can store data obtained in real time in a temporal storage device, and can store data decided to be stored in a long-time storable storage device.

The memory 150, in various embodiments, may store instructions to display visual effects with audio output by synchronizing tempo progress information about various components (for example, first music and second music). In various embodiments, the memory 150 can store instructions to make the controller 180 (for example, one or more processors) detect a roll creation event, identify an object from the original image in accordance with the roll creation event, and convert the original image into a roll image using the identified object in execution.

The memory 150 can continuously or temporarily store an Operating System (OS) of the electronic device 100, programs related to input through the touch screen 130 and display control, programs related to control of various operations (functions) of the electronic device 100, and various data generated by operations of the programs.

The memory 150 may include an extended memory (for example, an external memory) or an internal memory. The memory 150 may include at least one type or storage medium of flash memory type, hard disk type, micro type, and card type (for example, a Secure Digital (SD) card or an eXtream Digital (XD) card) memories, Dynamic Random Access Memory (DRAM), a Static RAM (SRAM), a Read-Only Memory (ROM), a Programmable ROM (PROM), an Electrically Erasable PROM (EEPROM), a Magnetic RAM (MRAM), and magnetic disk and optical disk type memories. The electronic device 100 can operate in association with a web storage that performs the storage function of the memory 150 on the internet.

The memory 150 can store various items of software. For example, software components may include an operating system software module, a communication software module, a graphic software module, a user interface software module, a Moving Picture Experts Group (MPEG) module and a camera software module, and one or more application software modules. A module that is a software component can be expressed in a set of instructions, so the module is also called an instruction set. The module is also expressed as a program.

The operating system software module may include various software components that control common system operations. The control of common system operations, for example, may mean memory management and control and power control and management. The operating system software module can also perform a function that makes communication between various items of hardware (devices) and a software component (module) smooth.

The communication software module can enable communication with other electronic devices such as a computer, a server, or a mobile terminal through the wireless communication unit 110. The communication software module may be configured in a protocol structure corresponding to a corresponding communication method.

The graphic software module may include various software components for providing and displaying graphics on the touch screen 130. The term 'graphics' may be used as a meaning that includes text, a web page, an icon, a digital image, a video, and an animation.

The user interface software module may include various software components related to a User Interface (UI). For example, the user interface software module may include details such as which state a user interface has been changed in or which condition the state of the user interface changes under.

The MPEG module may include software components that enable processes and functions (for example, creating, playing, distributing, and transmitting contents) related to digital contents (for example, video and audio).

The camera software module may include camera-related software components that enable processes and functions related to a camera.

The application module may include a browser including a rendering engine, emailing, instant messaging, word processing, keyboard emulation, an address book, a widget, digital right management (DRM), iris scanning, context cognition, voice recognition, a location based service, etc. In accordance with various embodiments, the application modules can process an operation (function) of creating a roll image corresponding to a taken or selected original image and displaying the created roll image.

The interface unit 160 can receive data or power from another external electronic device and transmit the data or power to the components in the electronic device 100. The interface unit 160 can enables data in the electronic device 100 to be transmitted to another external electronic device. For example, a wire/wireless headphone port, an external charger port, a wire/wireless data port, a memory card port, an audio input/output port, a video input/output port, and an earphone port may be included in the interface unit 160.

The camera module 170 is a component that supports a photographing function of the electronic device 100. The camera module 170 can be controlled by the controller 180 to photograph any object and transmit the photographed data (for example, an image) to the display 131 and the controller 180. The camera module 170 may include one or more image sensors. For example, the camera module 170 may include a front sensor (for example, a front camera) disposed on the front of the electronic device 100 (for example, in the same plane as the display 131) and a rear sensor (for example, a rear camera) disposed on the rear (for example, the back) of the electronic device 100.

The controller 180 can control general operations of the electronic device 100. For example, the controller 180 can perform various items of control related to creating, editing, and displaying roll images. The controller 180 may be achieved by one or more processors or the controller 180 may be called a processor. For example, the controller 180 may be included as an individual component such as Communication Processor (CP), an Application Processor (AP), an interface (for example, a General Purpose Input/Output (GPIO), or an internal memory, or may be integrated in one or more integrated circuits. The application processor can perform various functions for the electronic device 100 by executing various software programs and the communication processor can perform processing and controlling for voice communication and data communication. The controller 180 can take charge of performing various specific functions corresponding to a specific software module (an instruction set) stored in the memory 150 by executing the module.

In various embodiments, the controller 180 can sense an event corresponding to at least one of creating, editing, and displaying a roll image of an image displayed on the display 131 and can process at least one of operations that create, edit, and display a roll image on the basis of the event. The control operations of the controller 180 according to various embodiments will be described below with reference to the drawings.

The controller 180 according to an embodiment can control various operations related to common functions of the electronic device other than the functions described above. For example, when a specific application is executed, the controller 180 can control operation of the application and image display. The controller 180 can receive an input signal corresponding to input of various touch events or approach events supported by touch-based or approach-based input interface (for example, the touch screen 130) and can control operation according to the input signal. The controller 180 can also control transmission/reception of various data on the basis of wire communication or wireless communication.

The power supply unit 190 can be controlled by the controller 180 to receive external power or internal power and supply power for the operations of components. In an embodiment, the power supply unit 190 can be controlled by the controller 180 to supply or cut power to the display 131, the camera module 170 etc.

Various embodiments described herein may be implemented in a recording medium that can be read through a computer or devices similar to the computer, using software, hardware, or a combination thereof. According to hardware-based implementation, embodiments described herein can be achieved by at least one of Application Specific Integrated Circuits (ASICs), Digital Signal Processors (DPSs), Digital Signal Processing Devices (DSPDs), Programmable Logic Devices (PLDs), Field Programmable Gate Arrays (FPGAs), processors, controllers, micro-controllers, microprocessors, and other electric units for performing functions.

In an embodiment, the recording medium may include a computer-readable recording medium having programs for performing an operation of displaying an original image on the display, an operation of detecting a roll creation event, an operation of identifying an object from the original image in accordance with the roll creation event, and an operation of changing the original image into a roll image using the identified object.

In some cases, embodiments described in this specification may be implemented as the controller 180. According to software-based implementation, embodiments such as processes and functions described in this specification may be implemented as specific software modules. The software modules can perform one or more functions and operation described in this specification.

An electronic device according to various embodiments includes a display, a memory, and a controller operatively connected with the display and the memory, in which the controller may be configured to control the display to display an original image, detect a roll creation event, identify objects from the original image in accordance with the roll creation event, convert the original image into a roll image, using the identified objects, and store the roll image in the memory.

The controller may be configured to control the display to display an area setting frame on the displayed image in accordance with the roll creation event, determine a roll image creation area by moving the position of the area setting frame in accordance with selection by a user, and identify objects in the roll image creation area.

The controller may be configured to determine a boundary line, using the identified objects, and convert the original image into a roll image, using the objects or the boundary line.

The controller may be configured to determine the size of the roll image on the basis of at least one of the size of the original image, the objects, and the boundary line.

The controller may be configured to select a representative object on the basis of at least one of the priority, sizes, and properties of the objects and the properties of the original image and create the roll image on the basis of the representative object.

The controller may be configured to determine the boundary line on the basis of at least one of a color difference in the original image, the properties of the original image, and the sizes of the objects.

The electronic device may further include a camera module and the controller may be configured to determine the kind of an image obtained through the camera module and determine whether to create a roll image on the basis of the kind of the image.

The controller may be configured to create the roll image by converting the original image into a 3D spherical or circular image on the basis of the identified objects.

The objects may include at least one of a subject, a person, a thing, a background, and a natural environment and the roll image may be displayed such that a representative object of one or more objects in the original image is discriminated from other objects on the edge of the 3D sphere or circle.

In the roll image, a lower area from the boundary line of the original image may be shown in a 3D spherical or circular shape, an upper area from the boundary line of the original image may be shown as the outside of the 3D sphere or circle, and the identified objects are positioned at the center of the 3D sphere or circle.

The controller may be configured to control the display to display the roll image, detect user input, and change the sizes of the objects or the sphere in the roll image on the basis of the user input.

The controller may be configured to adjust the size of the sphere when the sizes of the objects are changed on the basis of the user input, and to adjust the sizes of the objects when the size of the sphere is changed on the basis of the user input.

The controller may be configured to search for a roll image of images stored in the memory and display an image list including the found roll image on the display when a roll image display event is detected.

The controller may be configured to create a roll image by checking metadata of contents displayed on the display and determining text and a spherical shape to display on the basis of the metadata.

Figure 2:
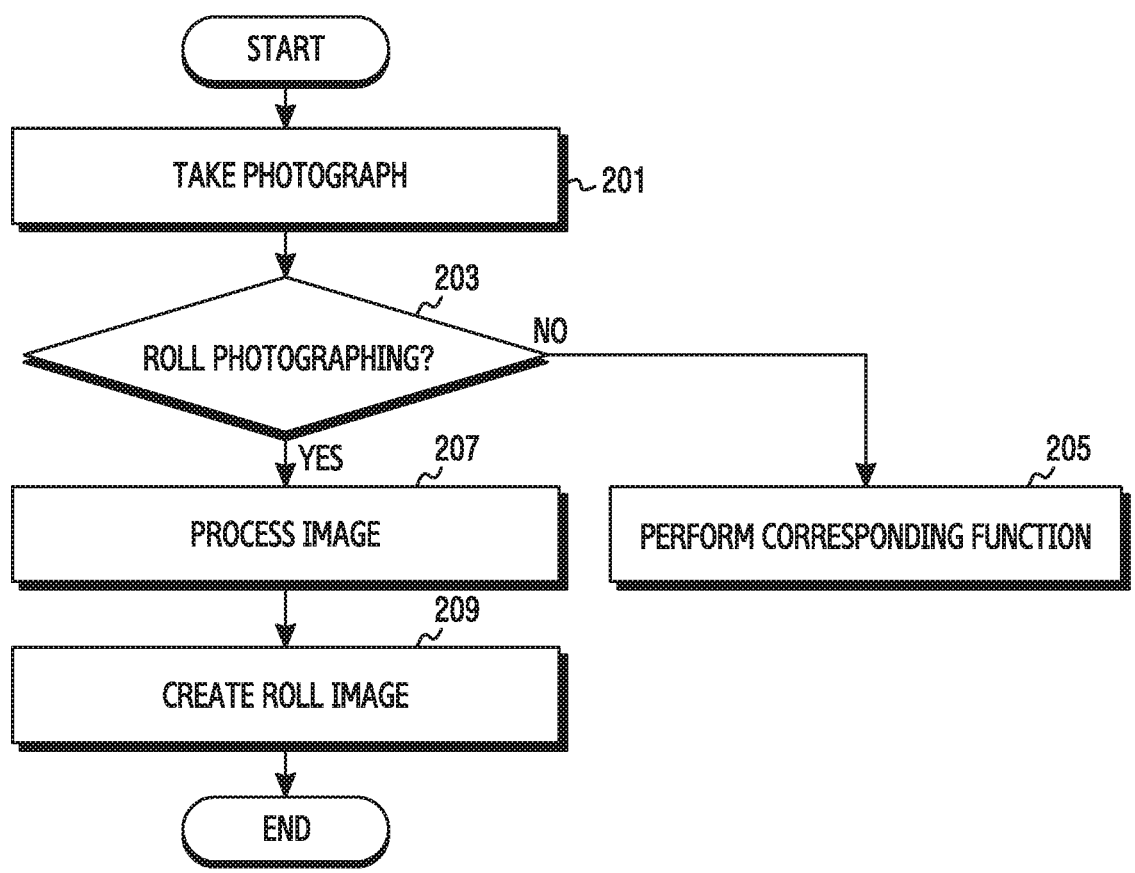
FIG. 2 is a flowchart showing a method of creating a roll image of an electronic device according to various embodiments.

FIG. 2 is a flowchart showing a method of creating a roll image of an electronic device according to various embodiments.

Referring to FIG. 2, in operation 201, the controller 180 can take a photograph. When a user selects a camera application, the controller 180 can execute the selected camera application. When the camera application is executed, a preview image can be displayed on the display 131. When a user selects "photograph", "ok", or a key (or a button) set for photographing, the controller 180 can photograph the preview image displayed on the display 131.

In operation 203, the controller 180 can determine whether the taken photograph corresponds to roll photographing. Roll photographing may mean that a taken image can be created as a roll image. For example, the roll photographing may mean taking a photograph with a larger photographing angle in comparison to common photographing such as surrounding or panoramic photographing. The controller 180 can perform operation 207 when it is roll photographing and perform operation 205 when it is not roll photographing.

When it is not roll photographing, in step 205, the controller 180 can perform a corresponding function. For example, when the taken photograph does not correspond to the roll photographing, the controller 180 can store the taken photograph. The photograph can be stored in an album (for example, a gallery application).

When it is roll photographing, in operation 207, the controller 180 can perform image processing on the taken image. The image processing, for example, may mean performing operations such as checking the size of the taken image and identifying objects in the taken image.

In operation 209, the controller 180 can create a roll image, using the taken photograph. The controller 180 can create the roll image by performing image processing on the taken photograph. For example, the controller 180 can create the roll image on the basis of the checked size or the identified objects. For example, the roll image may be obtained by converting a photograph taken in a planar type into a 3D type. For example, the roll image may be obtained by rolling a planar photograph into a 3D spherical shape or a circular shape.

That is, when a photograph is taken, the controller 180 determines whether the taken photograph can be created into a roll image, and when it is possible, the controller 180 can create a roll image, using the taken photograph, even without specific input from a user.

Figure 3:
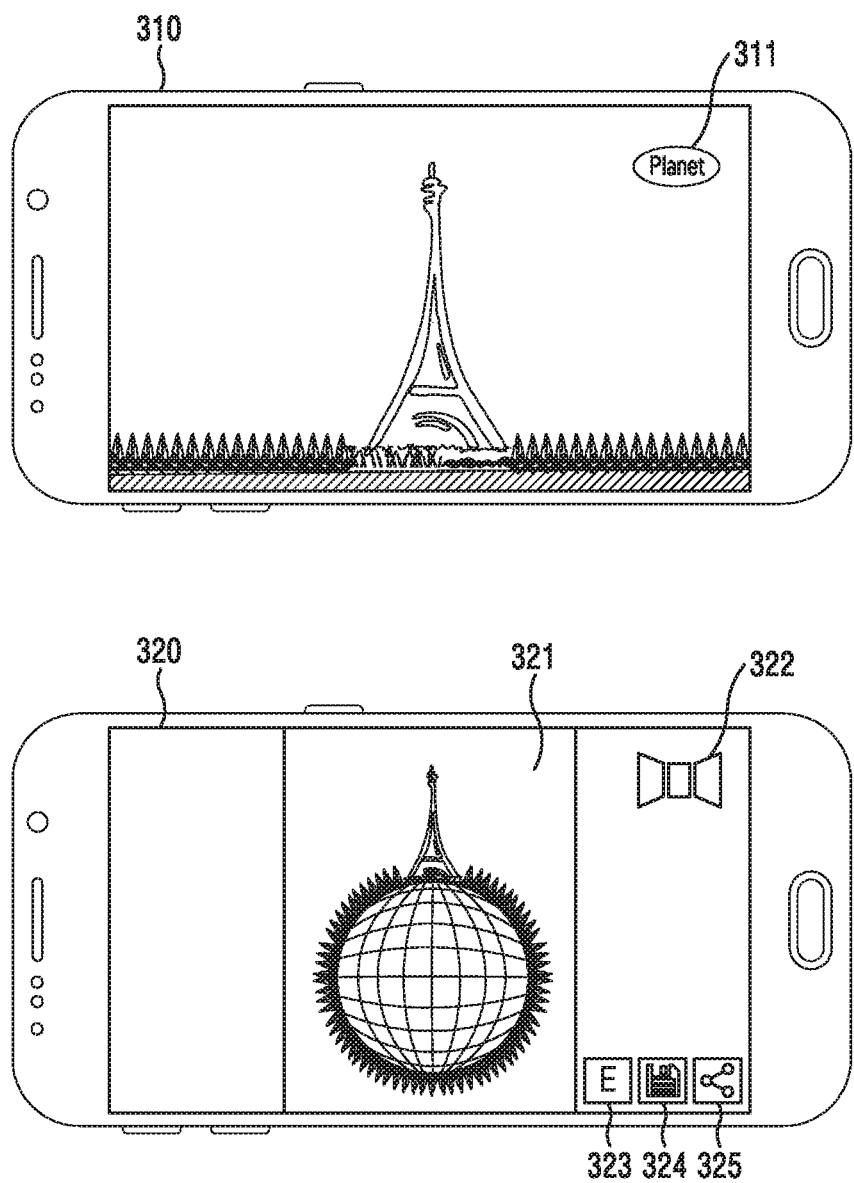
FIG. 3 is a diagram showing an example of creating a roll image according to various embodiments.

FIG. 3 is a diagram showing an example of creating a roll image according to various embodiments.

Referring to FIG. 3, the controller 180 can display a first user interface 310 including an original image (for example, a planar image) and a roll image creation button 311 for conversion into a roll image. For example, the first user interface 310 may include an original image obtained by photographing the Eiffel Tower and a roll image creation button (for example, 'Planet') 311 for converting the original image into a roll image. When the roll image creation button 311 is selected in the first user interface 310, the controller 180 can convert the original image into a roll image.

The controller 180 can display a second user interface 320 including a roll image 321 and a return button 322 for returning to an original image. When the roll image creation button 311 is selected from the first user interface 310, the controller 180 can display the second user interface 320. The roll image 321 is obtained by converting the original image (for example, the image obtained by photographing the Eiffel Tower) displayed on the first user interface 310 into a 3D spherical shape. The return button 322 may be provided to show the roll image 321 into the original image. For example, when the return button 322 is selected, the controller 180 can display the first user interface 310. The second user interface 320 may include an edit button 323 for editing the roll image 321, a storing button 324 for storing the roll image 321, and a sharing button 325 for sharing the roll image 321.

When the edit button 323 is selected, the controller 180 can provide a user interface for editing the roll image 321. When the storing button 324 is selected, the controller 180 can store the roll image 321 in the memory 150. When the sharing button 325 is selected, the controller 180 can display an application list related to a message, the Social Networking Service (SNS), and a messenger that allow for sharing the roll image 321. The application list may be displayed as an icon or text.

Figure 4:
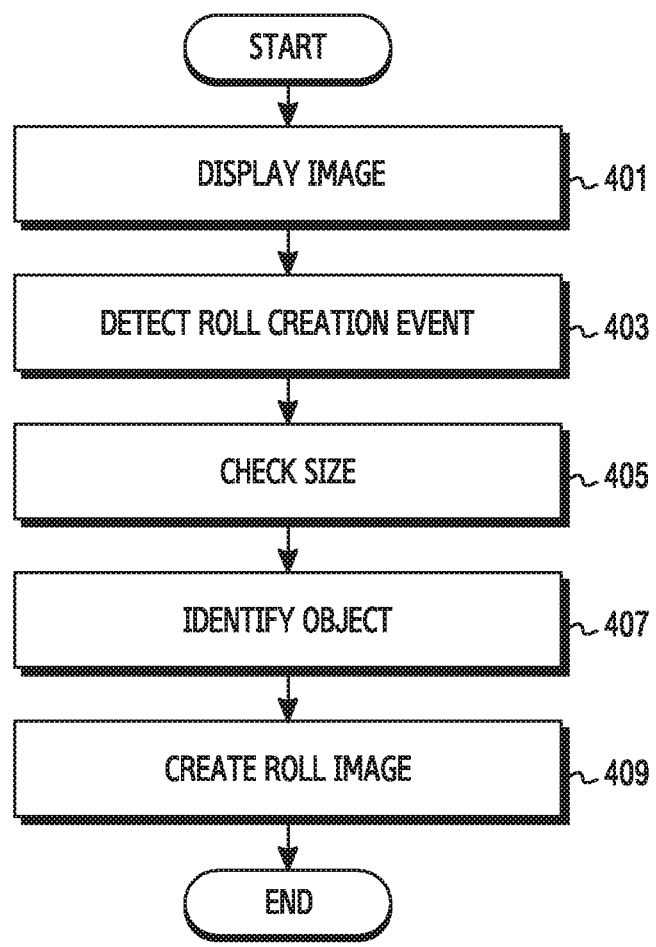
FIG. 4 is a flowchart showing a detailed method of creating a roll image according to various embodiments.

FIG. 4 is a flowchart showing a detailed method of creating a roll image according to various embodiments.

Referring to FIG. 4, in operation 401, the controller 180 can display an image on the display 131. The image (for example, an original image) displayed on the display 131 is an image selected by a user to be changed into a roll image, and for example, it may be a planar image. The planar image may be a concept including all of images taken in a surround mode (or function) and a panorama mode and an image taken in a normal (for example, automatic) mode of a camera. It is assumed that a planar image is an 'original image' to be discriminated from a roll image in the following description. However, the original image is not limited thereto.

In operation 403, the controller 180 can detect a roll creation event. For example, the roll creation event may be selection of a button for creating a roll image by a user or detection of a gesture for creating a roll image. Referring to FIG. 3, the roll creation event may be selection of the button (for example, 'Planet') 311 from the first user interface 310. Alternatively, the roll creation event may be detection of a predetermined gesture for creating a roll image with an original image displayed. The gesture may be set by a user or the electronic device 100. For example, the gesture may be input by a user closing at least two fingers (for example, pinching or zooming-in) or input by a user opening at least two fingers on the screen (for example, zooming-out or spreading).

In operation 405, the controller 180 can check the size of the original image. The size may be a concept including the area, width, and length of an image. For reference, the size of a roll image to be created may depend on the area, width, and length of an original image. The roll image is formed by rolling an original image in a 3D spherical shape and the size of the roll image may be determined by the area, width, and length of the original image.

The size may be set through the electronic device 100 or may be selected by a user. For example, when the roll creation event is selected, the controller 180 can display a frame for setting an area on the original image. A user can set an area for creating a roll image from the original image by moving the area setting frame. When there is no selection by a user, the controller 180 can determine the entire original image as a roll image creation area. Alternatively, the controller can determine the area in which the area setting frame is positioned as a roll image creation area in accordance with selection by the user.

In step 407, the controller 180 can identify objects. For example, the controller 180 can identify objects in the roll image creation area. For example, the objects, which are objects that have been photographed (for example, subjects), may be a person, a thing (for example, a building and a statue), a background, or a natural environment (for example, a tree, a mountain, a sea, and a river). The controller 180 can select a reference object from the identified objects. According to various embodiments, the controller 180 can select a representative object on the basis of at least one of the priority, sizes, and properties of the objects or the properties of an image. The representative object may be a thumbnail of an image.

The controller 180 can give priority to objects and select the object having high priority as a representative object. Since users attach importance to people when photographing, people may have high priority in comparison to other objects. Alternatively, the controller 180 may select a large object as a representative object. However, when other objects are larger than people, the controller 180 can select the representative object by further considering the properties of objects and the properties of an image. The controller 180 can select an object, which is shown more clearly and definitely than other objects, as a representative object on the basis of the properties (for example, the color and the clearness) of objects. Alternatively, the controller 180 can determine whether the image is a photograph of a person or a landscape on the basis of the properties of the image, select the person as a representative object when it is a photograph of a person, and select one of the landscape as a representative object when it is a photograph of a landscape.

In operation 409, the controller 180 can create a roll image. For example, the controller 180 can create the roll image on the basis of the identified objects. The controller 180 can create the roll image by converting the original image into a 3D spherical or circular image on the basis of the identified objects. The roll image may be displayed such that a representative object of one or more objects in the original image is discriminated from other objects in the 3D on the edge of the 3D sphere or the circle.

That is, the controller 180 can create a roll image by converting an image selected by a user. The selected image may be a common image or an image that is wider or larger in photographing angle than common images.

According to various embodiments, the controller 180 can create the roll image by further considering a boundary line (for example, the horizon). To this end, the controller 180 can determine the boundary line on the basis of at least one of a color difference in an image, the properties of an image, and the size of an object (or representative object). For example, the controller 180 can determine, as a boundary line, the border between two objects having a clear color difference such as a river (for example, yellow or gray) and the sky (for example, blue or white (for example, a cloud), and a forest (for example, green, brown, or red (for example, a maple)) and a sea (for example, blue). Alternatively, the controller 180 can divide an image into a part with a person and a part without a person on the basis of the properties of the image and determine the boundary as a boundary line. Accordingly, the controller 180 can create the roll image on the basis of the found size, the identified objects, and the determined boundary line.

Figure 5A:
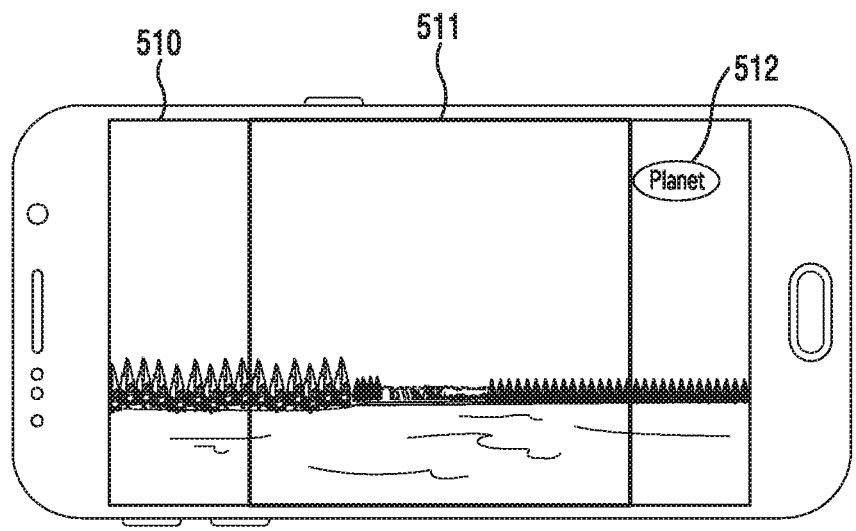
FIGS. 5A to 5C are views showing an example of creating a roll image on the basis of an object according to various embodiments.
Figure 5A:
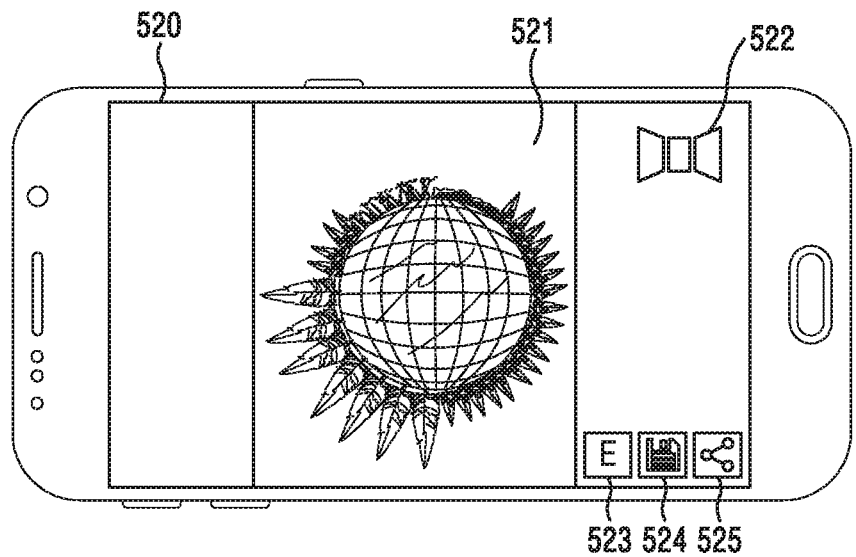
Figure 5B:
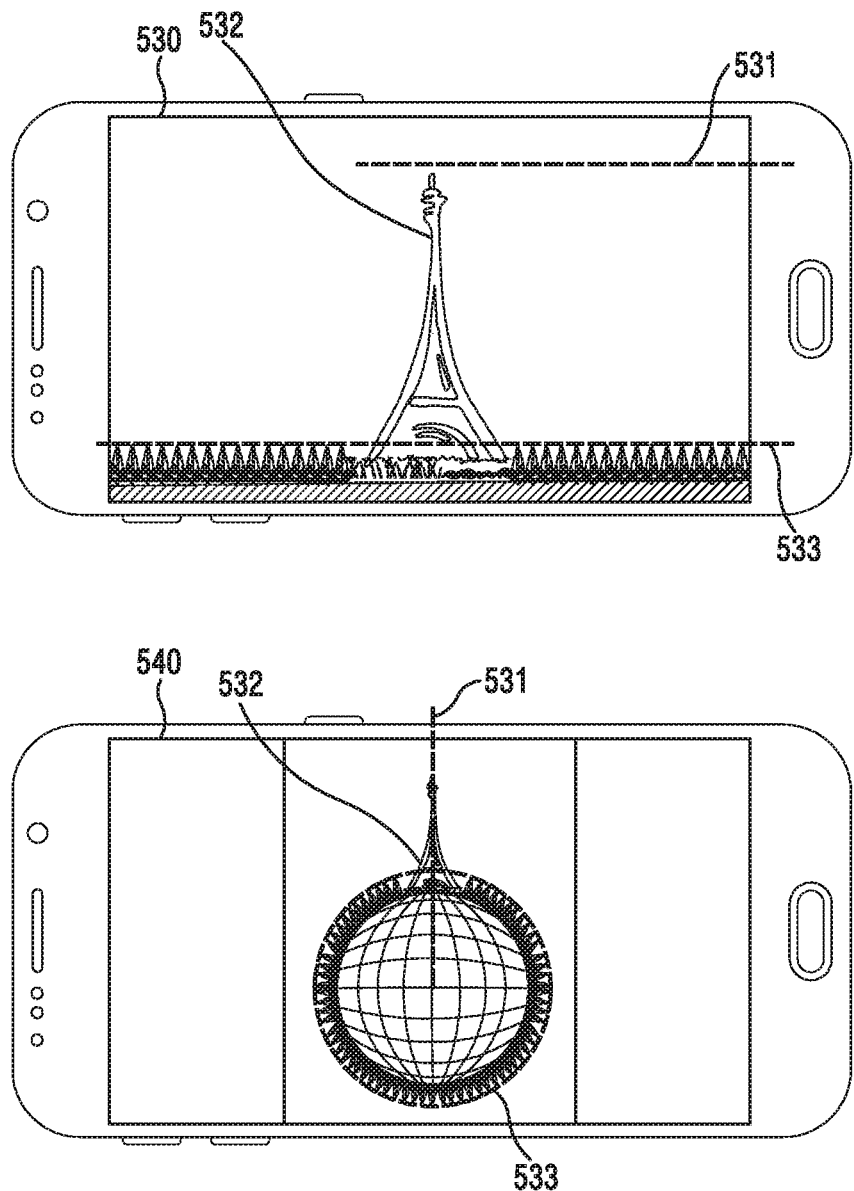
Figure 5C:
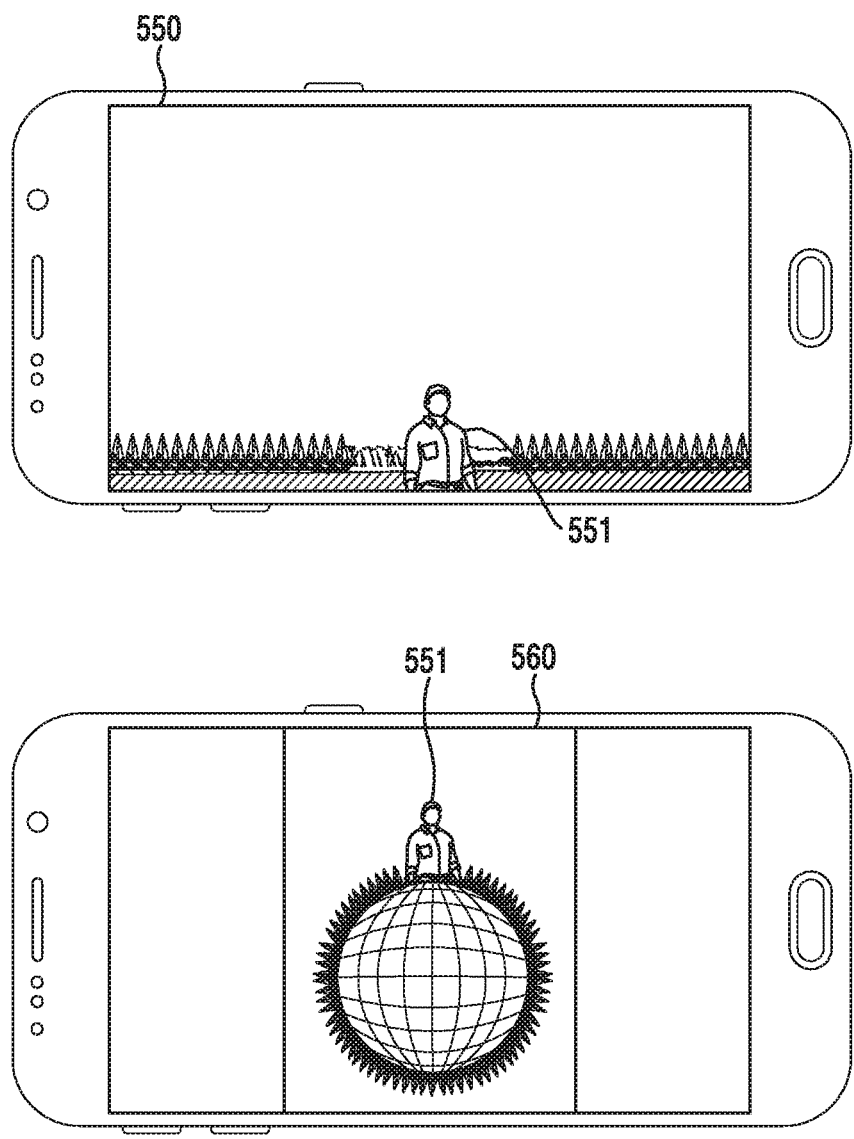

FIGS. 5A to 5C are views showing an example of creating a roll image on the basis of an object according to various embodiments.

FIG. 5A shows an example of creating a roll image using an image in an area set by a user. Referring to FIG. 5A, the controller 180 can display a first user interface 510 including an original image, an area setting frame 511, and a button 512 for conversion into a roll image. For example, the area setting frame 511 is a rectangular frame and is used to set an area to be created into a roll image. For example, a user can set an area to be created into a roll image by moving the area setting frame 511. That is, the user can select an area that can be easily discriminated in the entire area of the original image, using the area setting frame 511 to clearly identify the original image. When the area to be created into a roll image is set, the size of the roll image can be determined. When the set area is large, the sphere of a roll image may be large, and when the set area is small, the sphere of a roll image may be small.

When the button 512 is selected in the first user interface 510, the controller 180 can identify objects from the image in the area setting frame 511 and create a roll image using the identified objects. The controller 180 can display a second user interface 520 including a roll image 521, a return button 522 for returning to an original image, an edit button 523 for editing the roll image 521, a storing button 523 for storing the roll image 521, and a sharing button 525 for sharing the roll image 521.

FIG. 5B shows an example of creating a roll image using objects.

Referring to FIG. 5B, the controller 180 can identify objects in an original image displayed on a first user interface 530. For example, the controller 180 can identify the sky, the Eiffel Tower 532, trees, a forest etc. in an original image as objects. According to various embodiments, the controller 180 can select a representative object on the basis of at least one of the priority, sizes, and properties of the objects or the properties of an image.

The controller 180 can select an object higher than the horizon as a representative object and may select the Eiffel Tower 532 as a representative object in the original image on the first user interface 530. The height 531 and the bottom 533 can be selected on the basis of the Eiffel Tower 532 and the bottom 533 may be analyzed as a boundary line (for example, the horizon). The controller 180 can create a roll image, using the Eiffel Tower 532, the height 531 of the Eiffel Tower 532, and the boundary line 533. The controller 180 can display a second user interface 540 including the created roll image. Comparing the second user interface 540 with the first user interface 530, the roll image may be an image rolled in a spherical shape on the basis of the Eiffel Tower 532. For reference, the controller 180 can show the lower area (for example, trees, a forest, and grass) from the boundary line 533 of the original image in a 3D spherical shape or a circular shape and the upper area from the boundary line 533 (for example, the sky between the Eiffel Tower 532 and the boundary line 533) of the original image as the outside of the 3D sphere or the circle.

FIG. 5B shows another example of creating a roll image using objects. Referring to FIG. 5C, the controller 180 can identify objects in an original image displayed on a first user interface 550. For example, the controller 180 can identify the sky, a person 551, trees, grass etc. in an original image as objects. According to various embodiments, the controller 180 can select a representative object on the basis of at least one of the priority, sizes, and properties of the objects or the properties of an image. Since users attach importance to people when photographing, people may have high priority in comparison to other objects. The controller 180 can select the person 551 as a representative object and crate a roll image on the basis of the person 551.

According to various embodiments, when one or more people are identified as objects, the controller 180 can select a representative object on the basis of the positions (for example, the center and a side), the position relationships, and the sizes of the people in the original image. For example, the controller 180 may select a person at the center of a plurality of people as a representative object or a larger person than other people as a representative object.

The controller 180 can display the created roll image with a second user interface 560. Comparing the second user interface 560 with the first user interface 550, the roll image may be an image rolled in a spherical shape on the basis of the person 551. For example, the controller 180 can create a roll image in which the person 551 is disposed at the center of a 3D sphere or a circle, the lower area (for example, the trees and grass) from the person 551 is displayed in a 3D spherical shape or a circular shape, and the upper are (for example, the sky) from the person 551 is displayed outside the 3D sphere or the circle.

According to various embodiments, the controller 180 may maximize a representative object when creating a roll image. For example, when the representative object is a person, the controller 180 can create a roll image with the person maximized. When there is no person in an original image, the controller 180 may create a roll image with the object at the highest position maximized as a representative object.

Figure 6A:
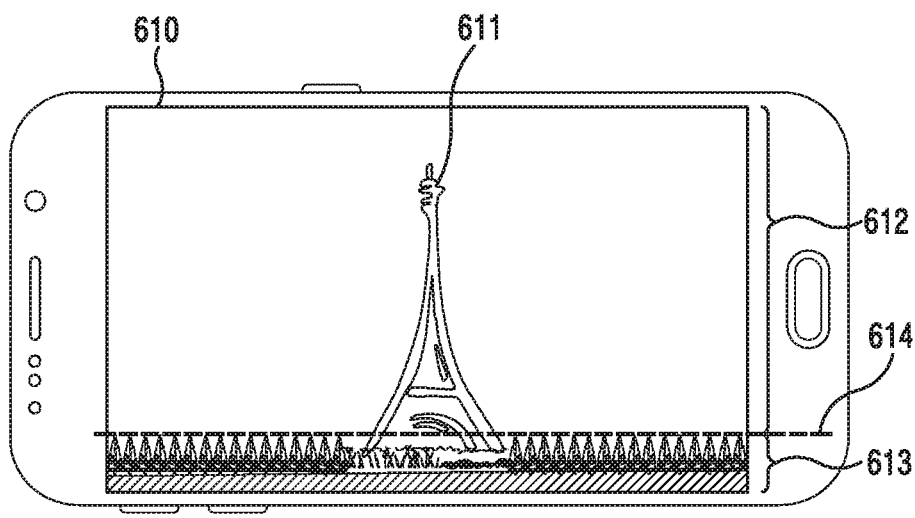
FIGS. 6A and 6B are views showing an example of creating a roll image on the basis of a boundary line according to various embodiments.
Figure 6A:
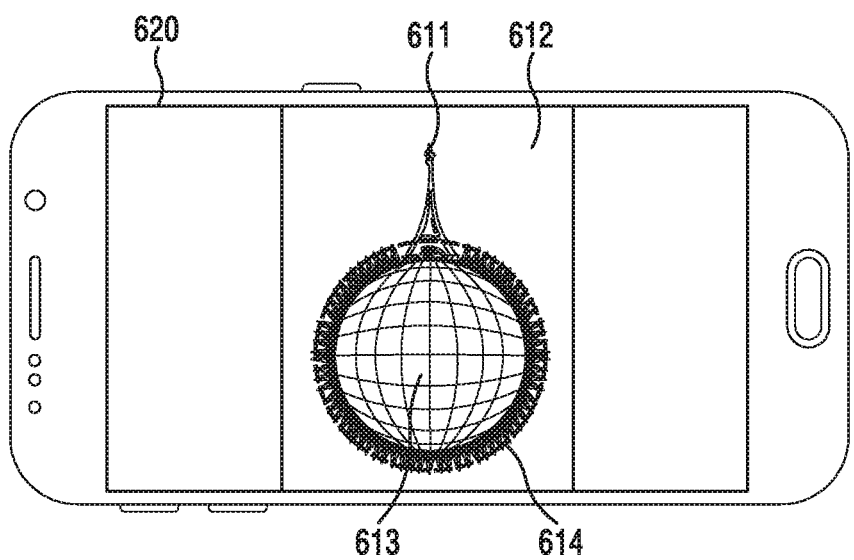
Figure 6B:
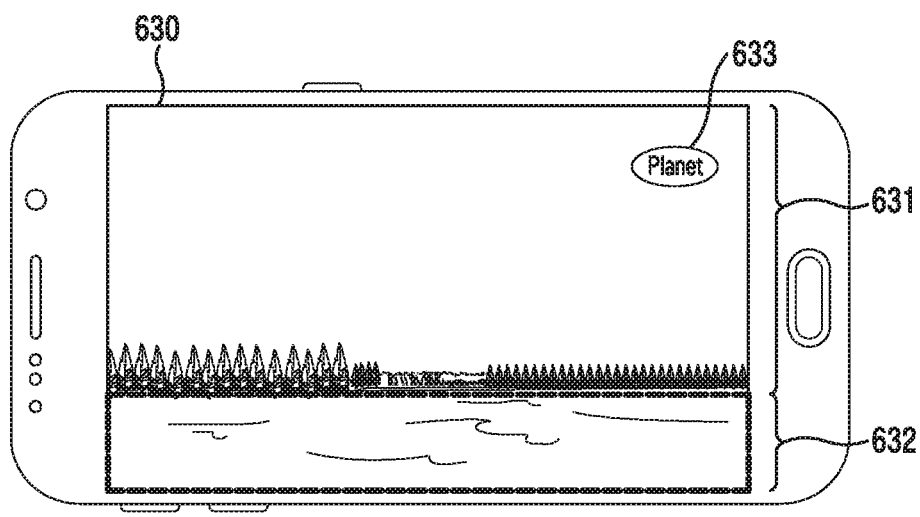
Figure 6B:
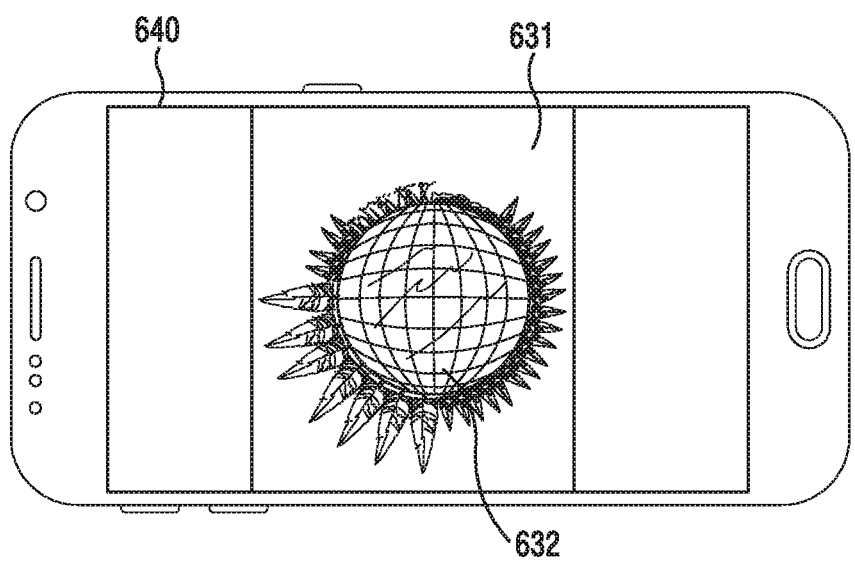

FIGS. 6A and 6B are views showing an example of creating a roll image on the basis of a boundary line according to various embodiments.

Referring to FIG. 6A, the controller 180 can identify at least one of the color and properties of an image and an object 611 in a first user interface 610 and determine a boundary line 614. The controller 180 can determine the boundary line 614 on the basis of at least one of a color difference in the image, the properties of an image, and the size of the object (or a representative object). For example, the controller 180 can determine the boundary line 614, using a part having clearly different colors between the sky 612 (for example, sky blue or blue) and the trees 613 (for example, green or brown) on the first user interface 610. The controller 180 can create a roll image, using the identified object 611 and the boundary line 614. The controller 180 can display a second user interface 620 including the created roll image. For example, the controller 180 can create a roll image in which the identified object 611 is positioned at the center of a sphere, a lower area 613 from the boundary line 614 is displayed in a spherical shape, and the upper area 612 from the boundary line 614 as the outside of the sphere.

Referring to FIG. 6B, the controller 180 can identify the colors and properties of an image or object in a first user interface 630. The controller 180 can identify similar colors of pixels having a predetermined thickness or more and transversely continuing throughout the entire screen on the first user interface 630. For example, the similar colors correspond to the sky 631 (for example, sky blue or blue) and a river 632 (for example, yellow or gray). The controller 180 can identify the color difference between the sky 631 and the river 632. For example, the controller 180 may not recognize a representative object in the first user interface 630. When a roll image creation button 633 is selected from the first user interface 630, the controller 180 can create a roll image on the basis of the color difference in the image. The controller 180 can display a second user interface 640 including the created roll image. For example, the controller 180 can create a roll image in which the river 632 is displayed in a spherical shape and the sky 631 as the outside of the sphere. The controller 180 can display the trees on the boundary line between the river 632 and the sky 631 on the border of the sphere.

FIGS. 7A to 7D are views showing an example of creating a roll image on the basis of a photographing angle according to various embodiments.

Figure 7A:
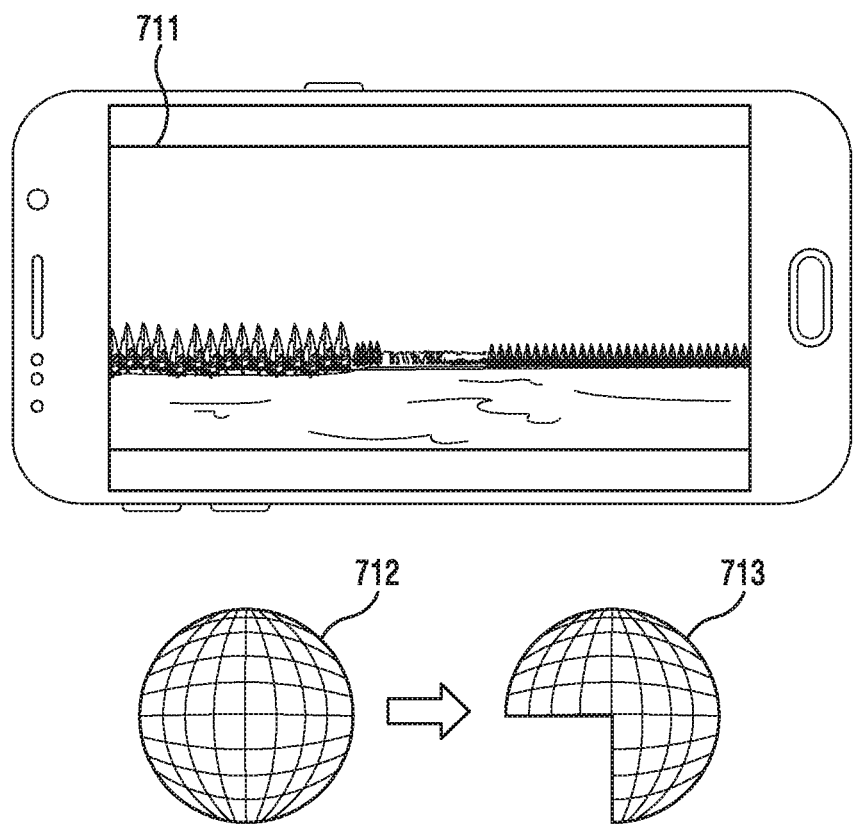
FIGS. 7A to 7D are views showing an example of creating a roll image on the basis of a photographing angle according to various embodiments.

FIG. 7A shows an image with a photographing angle of 270 degrees. An original image 711, for example, may have been taken in a panorama mode or a surround mode. The controller 180 can recognize the photographing angle on the basis of the properties of the original image 711. For example, the photographing in the panorama mode or the surround mode, the controller 180 can measure the photographing angle, using a gyro sensor or an acceleration sensor. The measured photographing angle can be stored as the properties of the original image 711 or metadata together with the image.

According to various embodiments, the controller 180 can also estimate the photographing angle on the basis of the length of the original image 711. For example, the controller 180 can estimate the absolute length of the original image 711, for example, when the difference of transverse/longitudinal pixel ratio is large, the controller 180 can estimate that the photographing angle is large.

The controller 180 can create a roll image in a spherical shape 712 on the basis of the original image 711. Alternatively, the controller 180 can determine a spherical shape on the basis of the length or angle of the original image 711 so that a user can easily know the photographing angle only from the shape of the roll image. That is, when converting into a spherical roll image, the controller 180 can create the roll image in a complete spherical shape for an image taken at 360 degrees. Alternatively, when the length of the original image 711 corresponds to a predetermined length (for example, 10 cm), the controller 180 can create a completely spherical roll image.

Alternatively, for an image taken along in the range of less than 360 degrees, the controller 180 can create a roll image with a part removed as much as a predetermined angle (for example, a piece of pie). For example, for an original image 711 taken at 270 degrees, the controller 180 can create a roll image in a spherical shape 713 with an area of about 90 degrees (for example, ¼ of a sphere) removed from a sphere. Alternatively, when the length of the original image 711 is less than a predetermined length (for example, 10 cm), the controller 180 can create a roll image with a predetermined area (for example, a piece of pie) removed from a sphere.

Figure 7B:
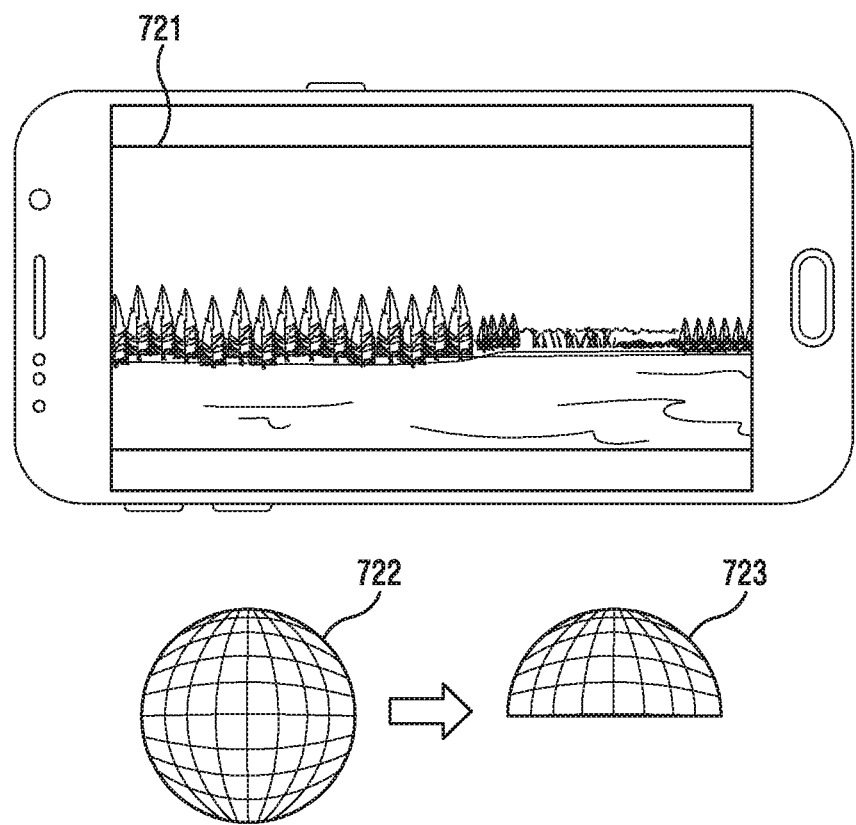

FIG. 7B shows an image taken in the range of 180 degrees. The controller 180 can create a roll image in a spherical shape 722 on the basis of the original image 721. Alternatively, the controller 180 can determine a spherical shape on the basis of the photographing angle or the length of the original image 721. For example, for an original image 721 taken at a photographing angle of 180 degrees, the controller 180 can create a roll image in a spherical shape 723 with an area of about 180 degrees (for example, ½ of a sphere) removed from a sphere. In this case, a user can easily know that the photographing angle is 180 degrees only from the shape of the roll image.

Figure 7C:
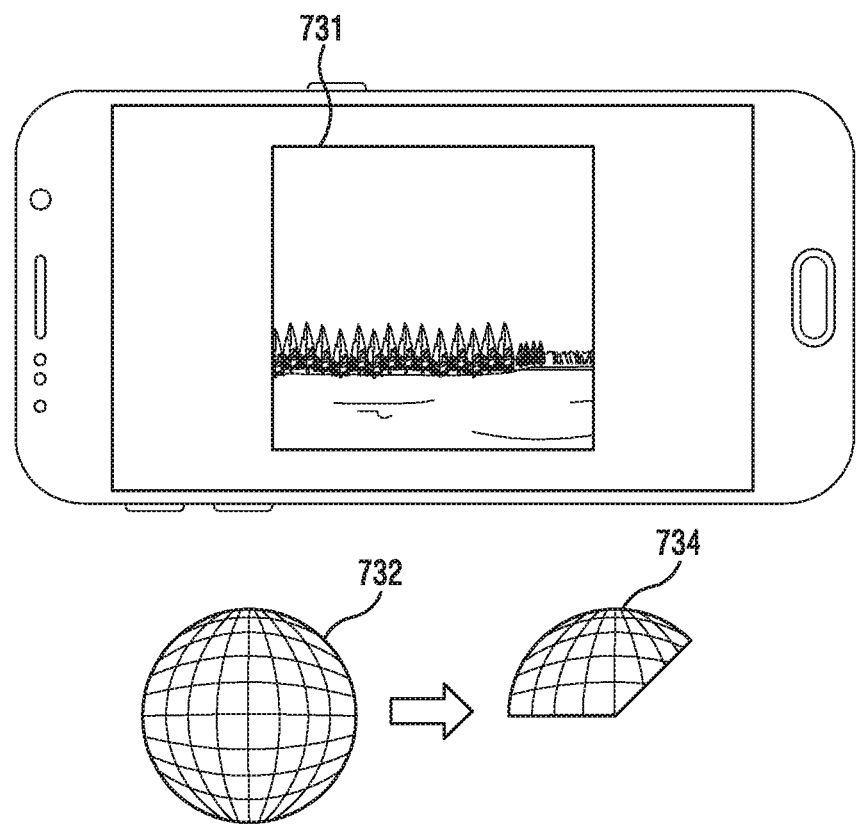

FIG. 7C shows an image taken in the range of 120 degrees. The controller 180 can create a roll image in a spherical shape 732 on the basis of the original image 731. Alternatively, the controller 180 can determine a spherical shape on the basis of the photographing angle or the length of the original image 731. For example, for an original image 731 taken at a photographing angle of 120 degrees, the controller 180 can create a roll image in a spherical shape 734 with an area of about 240 degrees (for example, ⅓ of a sphere) removed from a sphere.

Figure 7D:
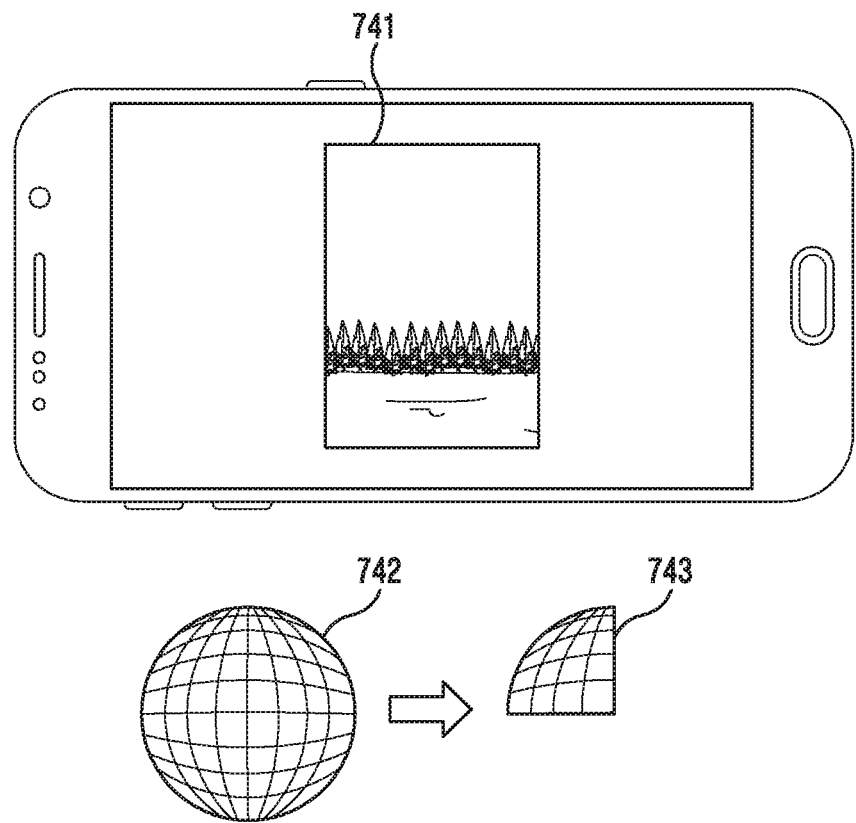

FIG. 7D shows an image taken in the range of 90 degrees. The controller 180 can create a roll image in a spherical shape 742 on the basis of the original image 741. Alternatively, the controller 180 can determine a spherical shape on the basis of the photographing angle or the length of the original image 741. For example, for an original image 741 taken at a photographing angle of 90 degrees, the controller 180 can create a roll image in a spherical shape 743 with an area of about 270 degrees (for example, ¾ of a sphere) removed from a sphere.

Accordingly, the controller 180 can relatively express a roll image on the basis of the length or angle of an image. That is, the controller 180 can express data about physical spaces (for example, an angle and a length) of an original image in infography.

Figure 8:
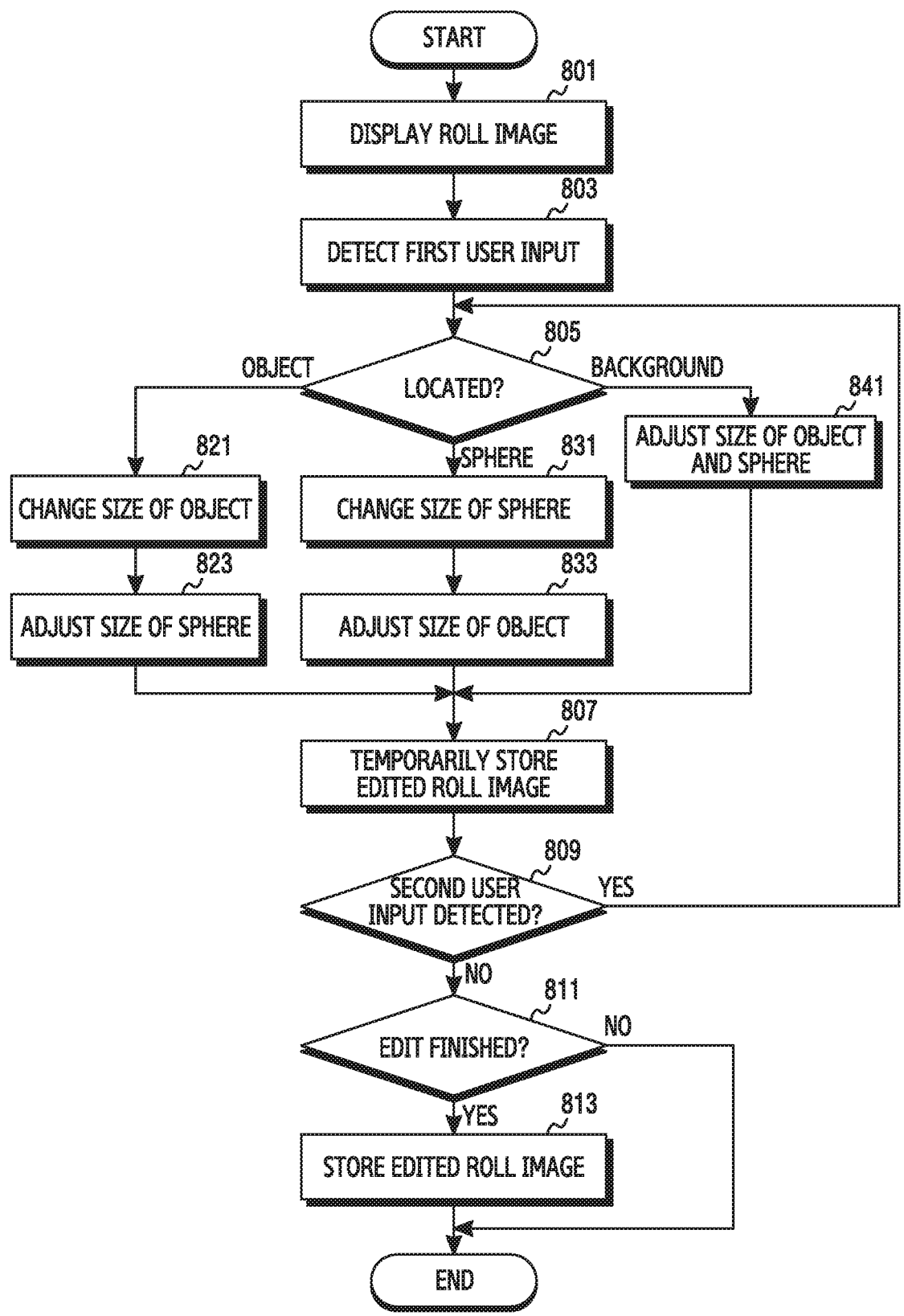
FIG. 8 is a flowchart showing a method of editing a roll image of an electronic device according to various embodiments.

FIG. 8 is a flowchart showing a method of editing a roll image of an electronic device according to various embodiments.

Referring to FIG. 8, in operation 801, the controller 180 can display a roll image. The roll image, as described above, may be displayed in a 3D spherical shape by rolling a planar image. For example, the controller 180 can display the roll image on a user interface for editing a roll image. Referring to FIG. 5A, when the edit button 523 is selected in the user interface 520 on which a roll image is displayed, the controller 180 can display the roll image on a roll image edit image.

In operation 803, the controller 180 can detect first user input. The first user input may be a touch on the roll image.

In operation 805, the controller 180 can find out the position of the first user input. The roll image may be composed of an object (for example, a person or a building), a sphere, and a background (for example, the part outside the sphere). The controller 180 can check where the first user input is detected of the object, the sphere, and the background in the roll image.

When the position of the first user input is the object, the controller 180 can perform operation 821, when the position of the first user input is the sphere, the controller 180 can perform operation 831, and when the position of the first user input is the background, the controller 180 can perform operation 841.

When the position of the first user input is the object, the controller 180 can change the size of the object on the basis of the first user input in operation 821. For example, a user may want the size of an object to be large in order to easily recognize a roll image. In this case, the user can select (or touch) the object to be changed in size and move (for example, drag) the touch with the object selected. That is, the user can move the touch without taking the finger off the object. The controller 180 can change the size of the object on the basis of the first user input in response to movement after touch.

In operation 823, the controller 180 can adjust the size of the sphere on the basis of the changed size of the object. Since the entire size of the roll image is fixed, when the size of an object is changed in the roll image, the size of a sphere can be determined by the changed size of the object. The controller 180 can change the sizes of the object and the sphere in inverse proportion. For example, when the size of the object is increased, the controller 180 can decrease the size of the sphere, and when the size of the object is decreased, the controller 180 can increase the size of the sphere. When the size of the object or the sphere is changed by the first user input, the controller 180 can reflect the changed part to the roll image and temporarily store the roll image.

When the position of the first user input is the sphere, the controller 180 can change the size of the sphere on the basis of the first user input in operation 831. The user can select (or touch) the edge of the sphere and move (for example, drag) the touch with the edge selected. That is, the user can move the touch without taking the finger off the object. The controller 180 can change the size of the sphere on the basis of the first user input in response to movement after touch.

In operation 833, the controller 180 can adjust the size of the object on the basis of the changed size of the sphere. When the size of the sphere is changed in the roll image, the controller 180 can adjust the size of the object in accordance with the changed size of the sphere. For example, when the size of the sphere is increased, the controller 180 can decrease the size of the object, and when the size of the sphere is decreased, the controller 180 can increase the size of the object. When the size of the object or the sphere is changed by the first user input, the controller 180 can reflect the changed part to the roll image and temporarily store the roll image.

When the position of the first user input is the background, the controller 180 can change the sizes of the object and the sphere on the basis of the first user input in operation 841. When the background is enlarged, the object and the sphere except for the background can be decreased in size, and when the background is reduced, the object and the sphere except for the background can be increased. When the size of the object or the sphere is changed by the first user input, the controller 180 can reflect the changed part to the roll image and temporarily store the roll image.

In operation 807, the controller 180 can temporarily store the edited roll image in accordance with the first user input. For example, when the first user input is finished (for example, the touch is removed), the controller 180 can temporarily store the edited roll image on the basis of the first user input. Alternatively even if the first user input is not finished, the controller 180 can temporarily store the roll image edited on the basis of the first user input.

In operation 809, the controller 180 can determine whether second user input is detected. The second user input may be discriminated from the first user input detected in operation 803. For example, the second user input may be detected after the first user input finished. For example, when a user moves a touch with an object or a sphere touched and the remove the touch, it may be possible to determine that the first user input has been finished. Alternatively, the second user input may be new input that is detected without the first user input finished. For example, the user can touch an object or sphere with a hand (or a finger) while moving a touch with another object or sphere touched by another hand (or finger).

When the second user input is detected, the controller 180 can return to operation 805 to find out the position of the second user input. When returning to operation 805, the controller 180 can perform at least one of operations 821 and 823, operations 831 and 833, and operation 841 described above no the basis of the second user input.

Alternatively, when the second user input is not detected, the controller 180 can perform operation 811 to determine whether editing has finished.

In operation 811, the controller 180 can determine whether editing has been finished. For example, when the first user input is finished, the controller 180 can determine that editing has been finished. Alternatively, when an edit completion button, a storing button, or a sharing button is selected after the first user input is finished, the controller 180 can determine that editing has been finished.

When editing is finished, the controller 180 can perform operation 813. In operation 813, the controller 180 can store the roll image temporarily stored in operation 807 as an edited roll image. For example, when a predetermined time passes after the first user input, the controller 180 can determine that editing has finished and store the edited roll image in the memory 150. The controller 180 can store the edited roll image instead of the roll image displayed in operation 801.

When editing is not finished, the controller 180 can end controlling. For example, when the first user input is not finished, and when an end button is selected without the user input finished or no input is detected after the first user input is finished, the controller 180 can end controlling. In this case, the controller 180 may not change the roll image displayed in operation 801.

FIGS. 9A to 9D are views showing an example of editing a roll image according to various embodiments.

Figure 9A:
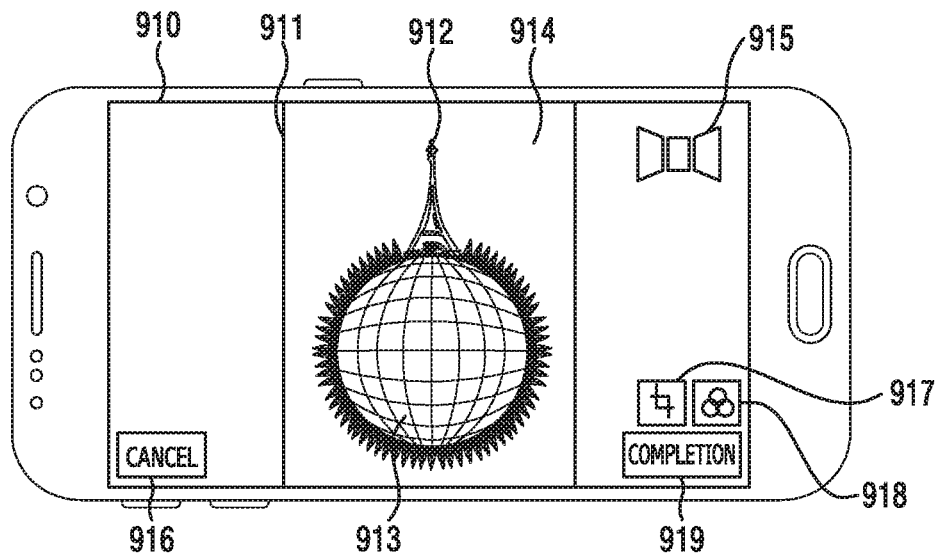
FIGS. 9A to 9D are views showing an example of editing a roll image according to various embodiments.
Figure 9A:
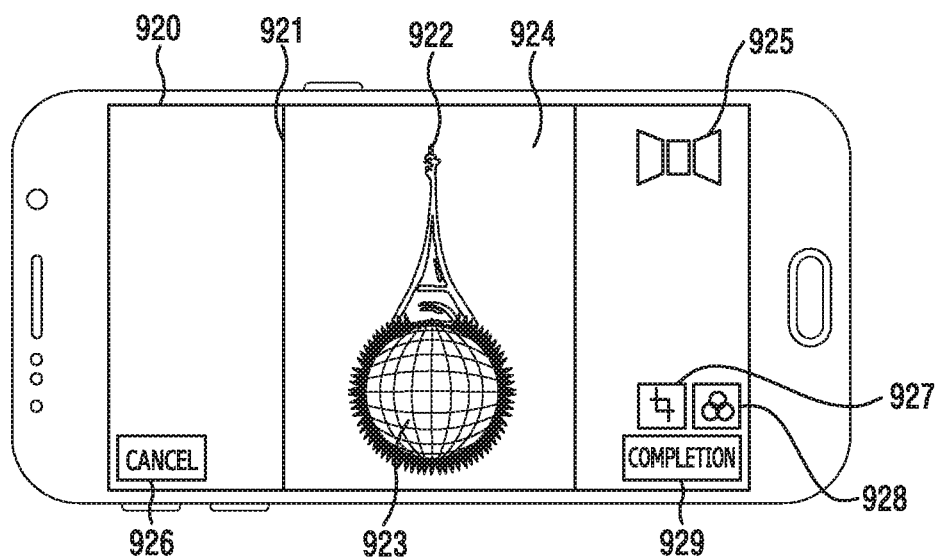

FIG. 9A shows an example of editing a roll image with a change in size of an object. Referring to FIG. 9A, the controller 180 can display a first user interface 910 for editing a roll image 911. The roll image 911 may include an object 912, a sphere 913, and a background 914. For example, the controller 180 can detect user input that a user moves a touch outside the screen with the object 912 touched and then remove the touch in the first user interface 910.

The first user interface 910 may include a return button 915 for returning to an original image, a cancel button 916, edit control buttons 917 and 918, and a completion button 919. When the return button 915 is selected, the controller 180 can display a planar image (for example, the first user interface 310 in FIG. 3). When the cancel button 916 is selected, the controller 180 can display an imaging showing the created roll image (for example, the second user interface 320 in FIG. 3). The first user interface 910 is an image for editing a roll image and the edit control buttons 917 and 918 for editing can be displayed on the first user interface 910. For example, a first edit control button 917 may be a cutting button and a second edit control button 918 may be a color adjustment button. The completion button 919 may be provided to reflect the user input before the completion button 919 is selected to a roll image and then store the roll image.

The controller 180 can display a second user interface 920 including the edited roll image 921 on the basis of user input that selects the object 922. The edited roll image 921 may be an image in which the sizes of the object 922 and the sphere 923 have been changed in the roll image 911 of the first user interface 910. For example, the edited roll image 921 may be an image in which the size of the object 922 has been increased on the basis of user input for increasing the size of the object 922 and the size of the sphere 923 has been decreased with the increase in size of the object 922. When the object 922 is not positioned at the center and the size of the object 922 is changed, the controller 180 can adjust the position of the object 922 to the center of the roll image 921.

The second user interface 920 may include a return button 925, a cancel button 926, edit control buttons 927 and 928, and a completion button 929. When the return button 925 is selected, the controller 180 can display a planar image (for example, the first user interface 310 in FIG. 3). When the cancel button 926 is selected, the controller 180 can display the image before the roll image is edited, for example, the first user interface 910. When the completion button 929 is selected, the controller 180 can store the edited roll image 921 in the memory 150 (for example, an album or a gallery).

Figure 9B:
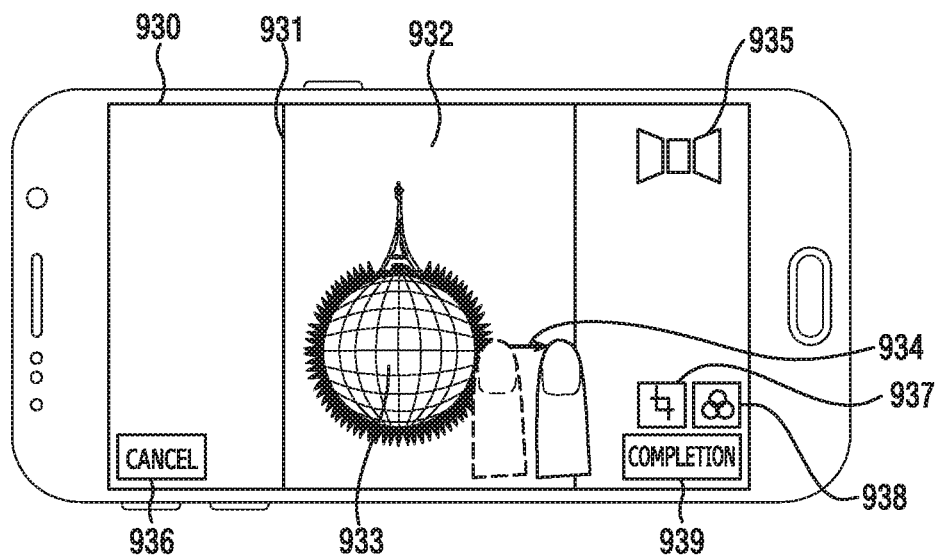
Figure 9B:
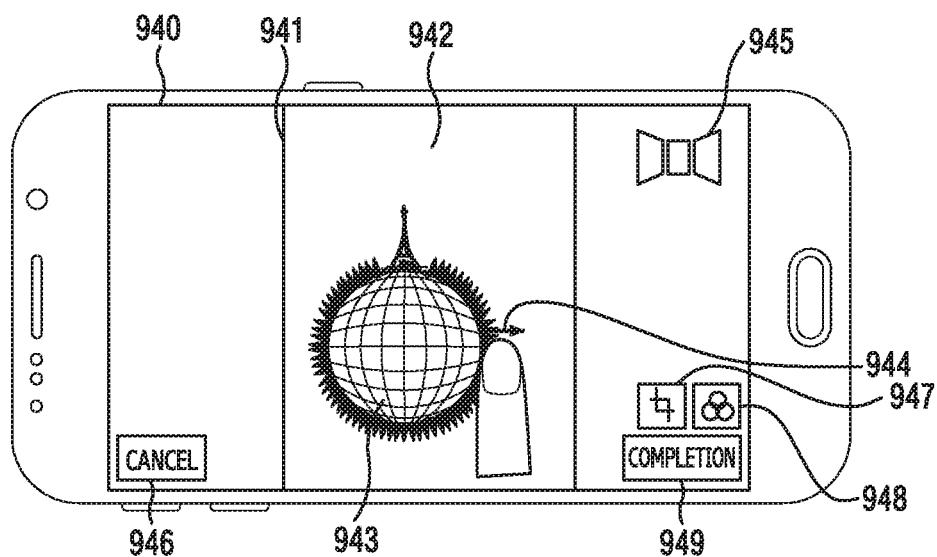

FIG. 9B shows an example of editing a roll image with a change in size of a sphere. Referring to FIG. 9B, the controller 180 can display a first user interface 930 for editing a roll image 931. The roll image 931 may include an object 932 and a sphere 933. For example, the controller 180 can detect user input 934 that a user moves a touch outside the sphere with the edge of the sphere 933 touched and then remove the touch in the first user interface 930. When the edge of the sphere 933 is touched, the controller 180 can emphasize (highlight) and display the edge of the sphere 933.

The first user interface 930 may include a return button 935 for returning to an original image, a cancel button 936, edit control buttons 937 and 938, and a completion button 939. When the return button 935 is selected, the controller 180 can display a planar image (for example, the first user interface 310 in FIG. 3). When the cancel button 936 is selected, the controller 180 can display an imaging showing the created roll image (for example, the second user interface 320 in FIG. 3). The first user interface 930 is an image for editing a roll image and the edit control buttons 927 and 928 for editing can be displayed on the first user interface 930. The completion button 939 may be provided to reflect the user input before the completion button 939 is selected to a roll image and then store the roll image.

The controller 180 can display a second user interface 940 including the edited roll image 941 on the basis of user input that selects the object 942. The edited roll image 941 may be an image in which the sizes of the object 942 and the sphere 943 have been changed in the roll image 941 of the first user interface 940. For example, the edited roll image 941 may be an image in which the size of the sphere 943 has been increased on the basis of user input for increasing the size of the sphere 943 and the size of the object 942 has been decreased with the increase in size of the sphere 943. When changing the size of the sphere 943, the controller 180 can adjust the position of the object 942 to the center of the roll image 941.

The second user interface 940 may include a return button 945, a cancel button 946, edit control buttons 947 and 948, and a completion button 949. When the return button 945 is selected, the controller 180 can display a planar image (for example, the first user interface 310 in FIG. 3). When the cancel button 946 is selected, the controller 180 can display the image before the roll image is edited, for example, the first user interface 930. When the completion button 949 is selected, the controller 180 can store the edited roll image 941 in the memory 150 (for example, an album or a gallery).

Figure 9C:
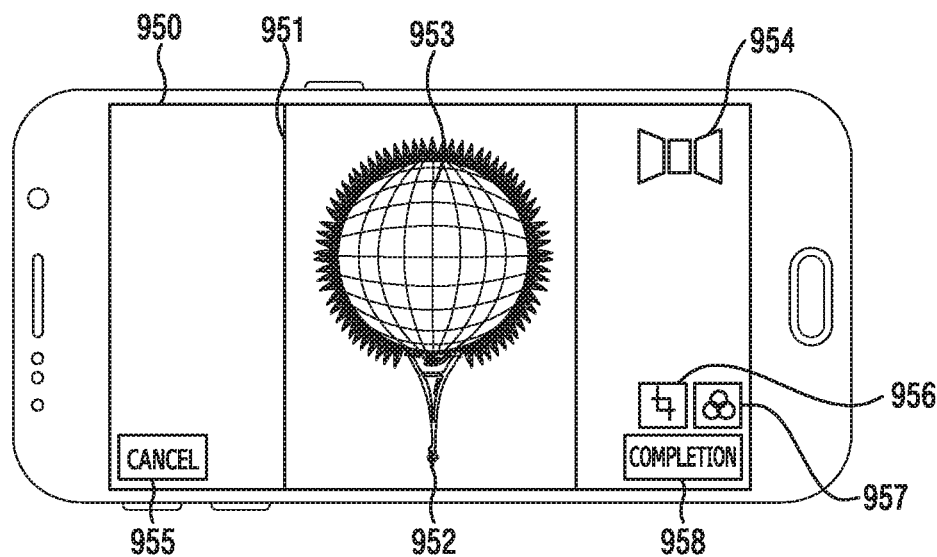

FIG. 9C shows another example of editing a roll image with a change in size of a sphere. Referring to FIG. 9C, when the controller 180 increases the size of the sphere 943 in the second user interface 940, it can display a third user interface 950 for inverting an object 952. When the size of the sphere 953 is chanted over a predetermined level (for example, a reference level or a critical level), the controller 180 can edit the roll image such that the position of the object 952 is changed. That is, the edited roll image 951 may be an image in which the size of the sphere 943 is the same as that in the edited image 941 on the second user interface 940, but the position of the object 952 has been moved down. Alternatively, the edited roll image 951 may be an image in which the sphere 953 has been increased in size more than the size of the sphere 943 on the second user interface 940, but the position of the object 952 has been moved down.

The third user interface 950 may include a return button 954, a cancel button 955, edit control buttons 956 and 957, and a completion button 958. When the return button 954 is selected, the controller 180 can display a planar image (for example, the first user interface 310 in FIG. 3). When the cancel button 955 is selected, the controller 180 can display the image before the roll image is edited, for example, the first user interface 930 or the second user interface 940. When the completion button 958 is selected, the controller 180 can store the edited roll image 951 in the memory 150 (for example, an album or a gallery).

Figure 9D:
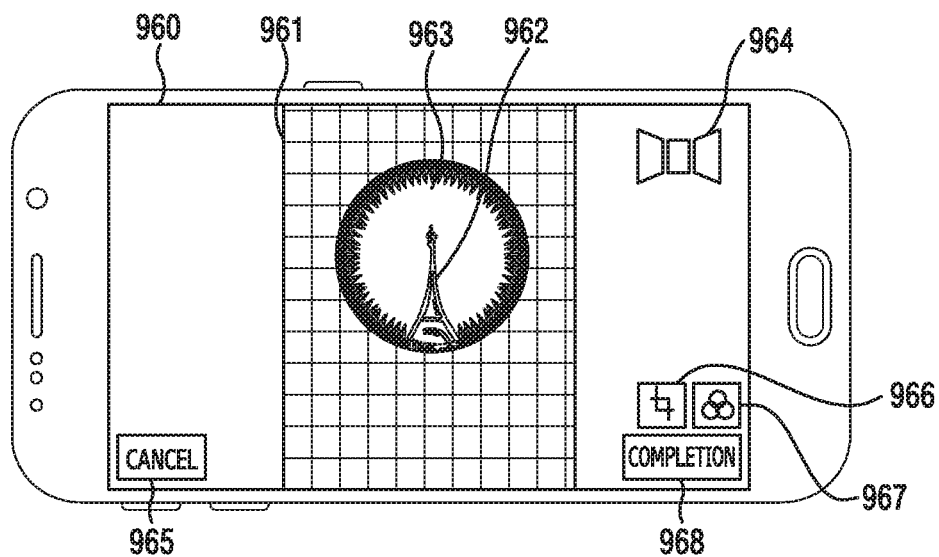

FIG. 9D shows another example of editing a roll image with a change in size of a sphere. Referring to FIG. 9D, when the controller 180 increases the size of the sphere 943 in the second user interface 940, it can display a third user interface 950 for inverting an object 962 and turning inside out a sphere 963. When the size of the sphere 963 is changed over a predetermined level (for example, a reference level or a critical level), the controller 180 can edit the roll image such that the position of the object 962 is changed. That is, the edited roll image 961 may be an image in which the object 962 is moved in the sphere and the inside (for example, the sky) and the outside (for example, grass) of the sphere 963 are exchanged. That is, if the inside of the sphere 941 was grass and the outside of the sphere 941 was the sky on the second user interface 940 before the size of the sphere is changed, the outside of the sphere 963 can be changed to the sky and the outside of the sphere 963 is changed to the grass on the third user interface 960 after the size of the sphere is increased.

The third user interface 960 may include a return button 964, a cancel button 965, edit control buttons 966 and 967, and a completion button 968. When the return button 964 is selected, the controller 180 can display a planar image (for example, the first user interface 310 in FIG. 3). When the cancel button 965 is selected, the controller 180 can display the image before the roll image is edited, for example, the first user interface 930 or the second user interface 940. When the completion button 968 is selected, the controller 180 can store the edited roll image 961 in the memory 150 (for example, an album or a gallery).

Figure 10:
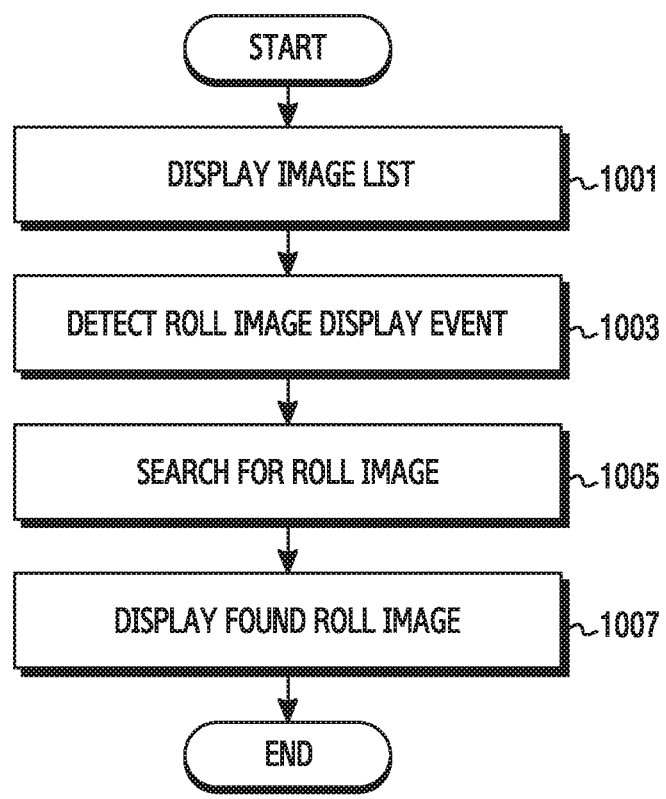
FIG. 10 is a flowchart showing a method of providing a roll image of an electronic device according to various embodiments.

FIG. 10 is a flowchart showing a method of providing a roll image of an electronic device according to various embodiments.

Referring to FIG. 10, in operation 1001, the controller 180 can display an image list including a plurality of images on the display 131. The image list may include at least one of a common image, an image (for example, a panorama image) wider than the common image, and a roll image.

In operation 1003, the controller 180 can detect a roll image display event. The roll image display event may be an event for displaying only the roll image in the image list. Alternatively, the roll image display event may be an event for converting and displaying all of the images in the image list into roll images. The roll image display event may depend on setting by a user or setting of the electronic device 100.

In operation 1005, the controller 180 can search for a roll image. When the roll image display event is an event for displaying a roll image that has been created already, the controller 180 can search for a roll image in the memory 150 (for example, an album or a gallery).

In operation 1007, the controller 180 can display the found roll image. For example, the image list displayed in operation 1001 and the image list displayed after operation 1007 is performed may be different. For example, the image list displayed in operation 1001 may show only common images, but the image list displayed after operation 1007 is performed may show only roll images.

Figure 11A:
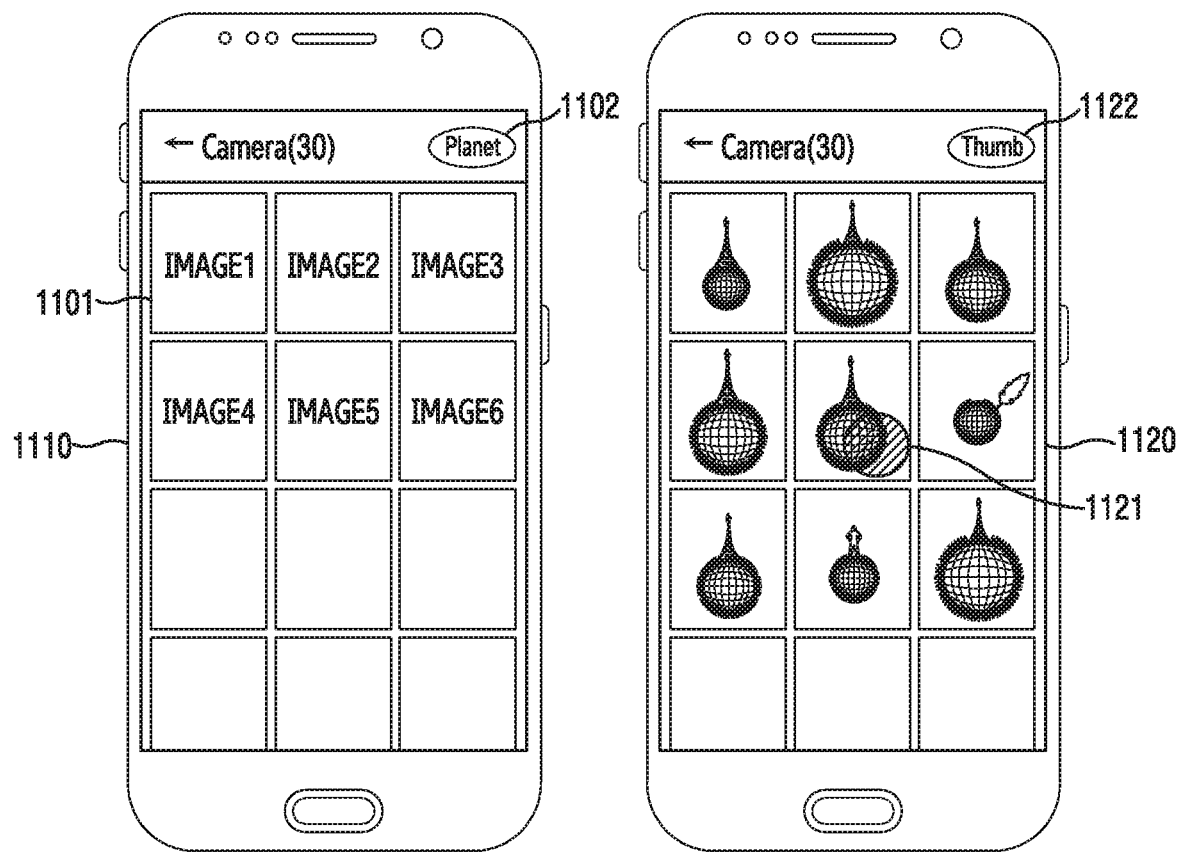
FIGS. 11A and 11B are views showing an example of providing a roll image according to various embodiments.
Figure 11B:
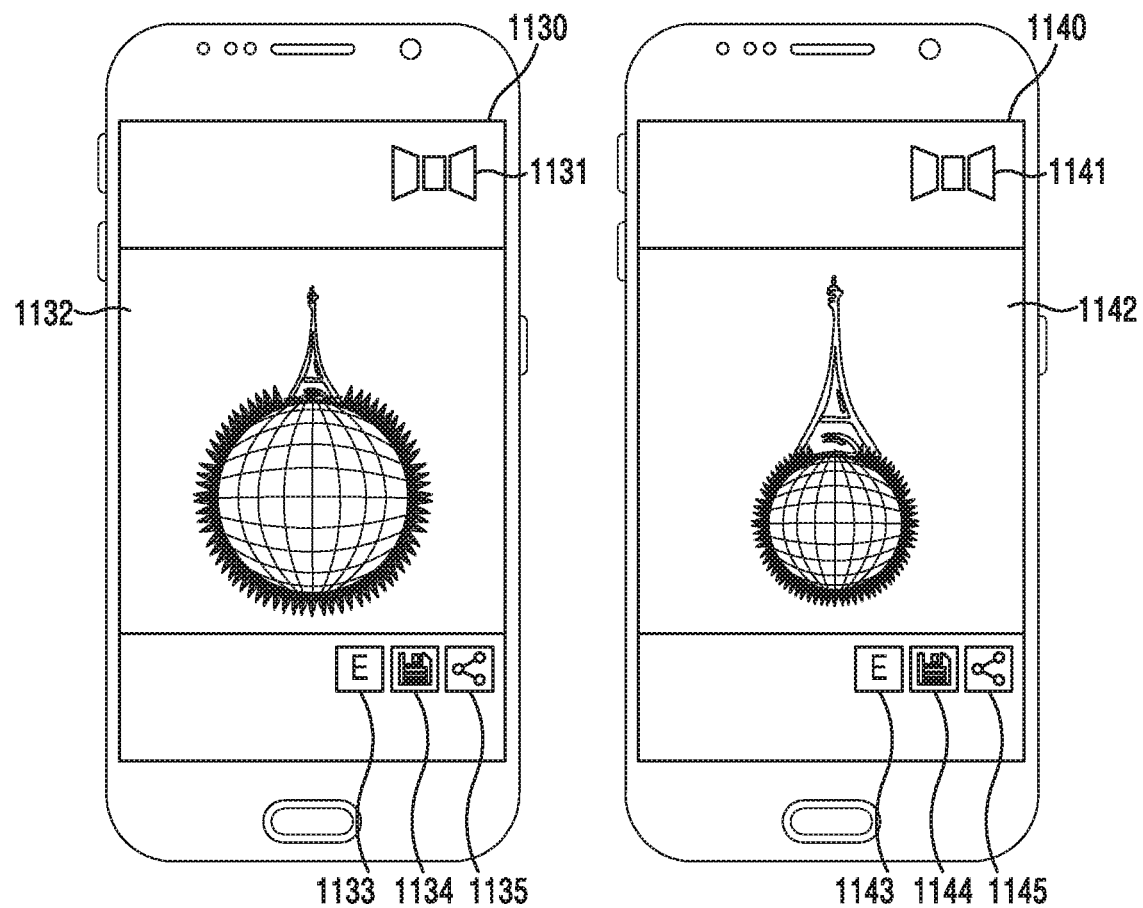

FIGS. 11A and 11B are views showing an example of providing a roll image according to various embodiments.

FIG. 11A shows an example of displaying an image list. Referring to FIG. 11A, the controller 180 can provide a first user interface 1110 showing an image list including a plurality of images. The image 1 1101 in the image list may be a common image. The common image may be an image generally taken or created in accordance with defaults of the electronic device 100. Alternatively the images in the image list may include not only a common image, but at least one of an image (for example, a panorama image) wider than the common image and a roll image. When a user selects a 'Planet' button 1102 on the first user interface 1110, the controller 180 can determine that a roll image display event has been detected.

When the roll image display event is detected, the controller 180 can provide a second user interface 1120 showing an image list including only roll images. Accordingly, a user can check all roll images at a glance. When a user selects a 'Thumb' button 1122 on the second user interface 1120, the controller 180 can determine that an original image display event has been detected. When determining that original image display event has been detected, the controller 180 can display the first user interface 1110. Alternatively, when a user selects any one of the roll images 1121 on the second user interface 1120, the controller 180 can display a third user interface 1130 showing only the selected roll image 1121 on the display 131.

FIG. 11B shows an example of displaying a roll image. Referring to FIG. 11B, the controller 180 can display the third user interface 1130 including a roll image 1132 selected on the second user interface 1120. The third user interface 1130 may include a return button 1131 for returning to an original image, an edit button 1133 for editing the roll image 1132, a button 1134 for storing the roll image 1132, and a button 1135 for sharing the roll image 1132.

The controller 180 can edit the roll image on the third user interface 1130 on the basis of user input and provide a fourth user interface 1140 including the edited roll image 1142. The roll image 1142 edited from the roll image 1132 displayed on the third user interface 1130 may be displayed on the fourth user interface 1140. That is, even if the edit button 1133 is not selected by the user on the third user interface 1130, when user input is detected on the roll image 1132, the controller 180 can edit the roll image on the basis of the detected user input. The edited roll image 1142 may be an image in which the size of an object (for example, the Eiffel Tower) was increased and the size of a sphere was decreased, as compared with the original roll image 1132.

When the return button 1141 is selected, the controller 180 can display a user interface (for example, 310 in FIG. 3) including the original image of the edited roll image 1142. When the edit button 1143 is selected, the controller 180 can provide a user interface for editing the roll image 1142. When the store button 1144 is selected, the controller 180 can store the roll image 1142 in the memory 150. When the sharing button 1145 is selected, the controller 180 can display a list of applications (for example, a message, a messenger, and a social network service) that allow for sharing the roll image 1142 in a pop-up.

Figure 12:
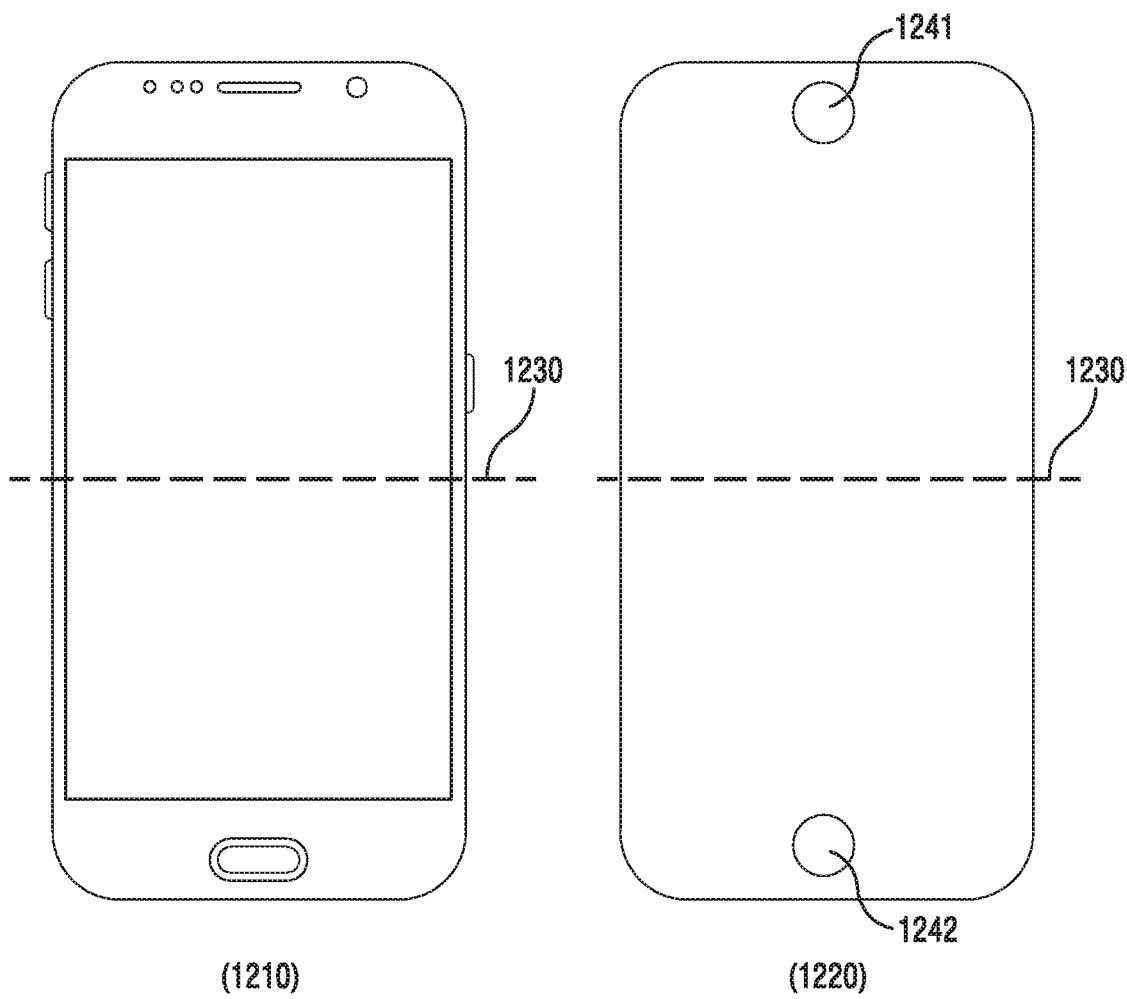
FIG. 12 is a block diagram showing an example of an electronic device according to various embodiments.

FIG. 12 is a block diagram showing an example of an electronic device according to various embodiments.

Referring to FIG. 12, an electronic device 1210 may be a bended display. For example, the electronic device 1210 can be folded at the middle portion when it is longitudinally positioned. Alternatively, an electronic device 1210 may be a bended display that is folded at the middle portion 1230 and may include two camera modules 1241 and 1242 on the rear (for example, the back). For example, the electronic device 1220 may include a first camera module 1241 at the upper portion of the rear and a second camera module 1242 at the lower portion of the rear when it is longitudinally positioned.

According to various embodiments, the electronic devices 1210 and 1220 may be implemented in a shape that allows for easily taking photographs with a wide angle. For example, the electronic devices 1210 and 1220 take a photograph using the two camera modules 1241 and 1242 with the middle portion 1230 folded, it is possible to take a panorama image (or a surround image) from which a roll image can be easily created.

Figure 13:
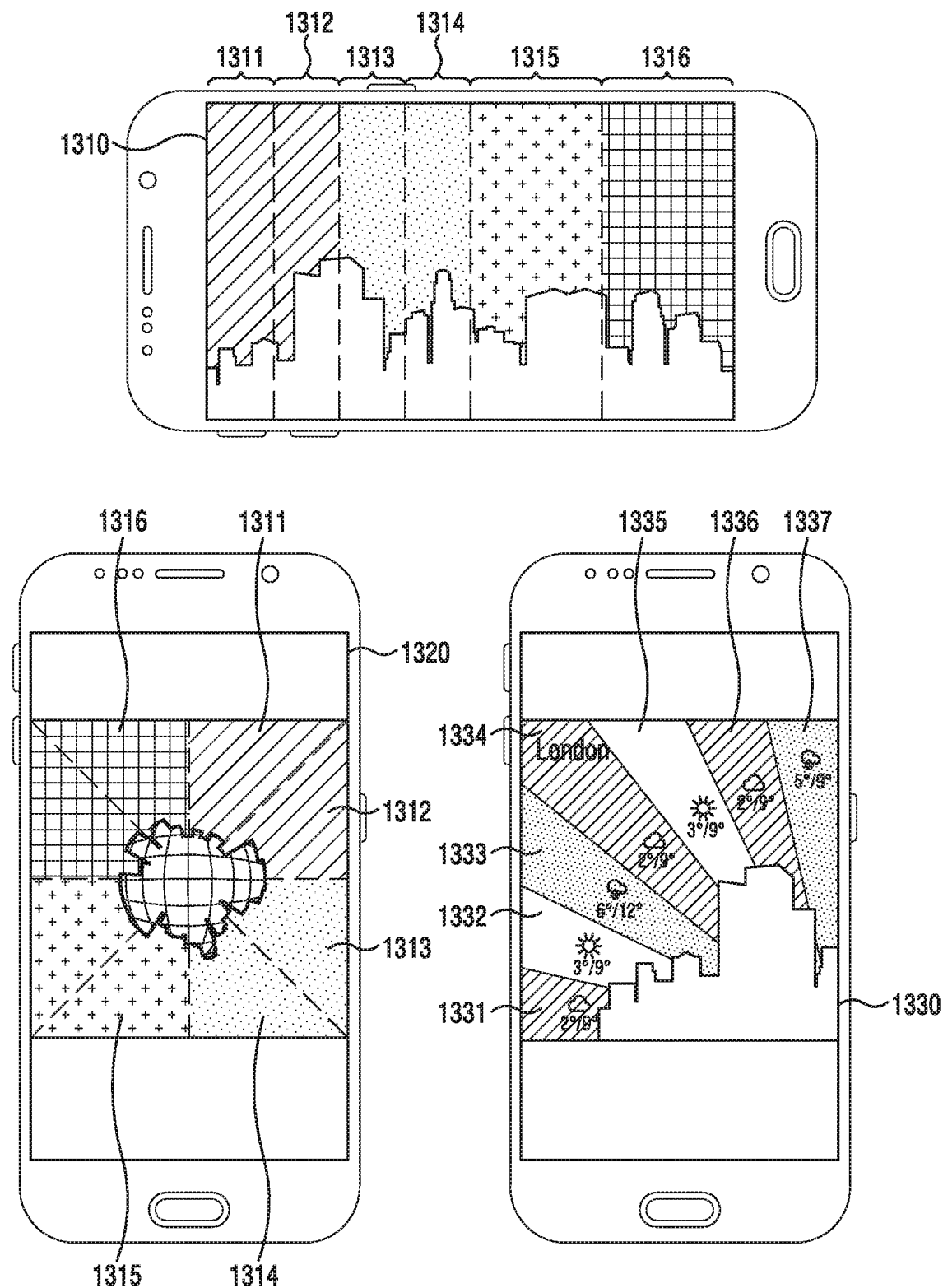
FIG. 13 is a block diagram showing an example of displaying contents according to various embodiments.

FIG. 13 is a block diagram showing an example of displaying contents according to various embodiments.

Referring to FIG. 13, the controller 180 can divide one image into a plurality of sections and display a first user interface 1310 showing weather in each of the divided sections. For example, the first user interface 1310 may divide one image into six sections (for example, 1311, 1312, 1313, 1314, 1315, and 1316) in order of time (for example, to the right) and shows weather with colors (or shapes) in the divided sections. The sections on the first user interface 1310 are longitudinally divided when the electronic device 100 is positioned in a transverse mode, and for example, may visualize the weather of a day.

For example, the sections 1311 and 1312 show weather from 0 a.m. to 3 a.m. (for example, the section 1311) and from 3 a.m. to 6 a.m. (for example, the section 1312), in which the weather may be the same or similar. When the weather is the same or similar, the sections 1311 and 1312 can be shown with the same color or similar colors. The sections 1313 and 1314 show weather from 6 a.m. to 12 p.m., in which the weather may be the same or similar. The section 1315 shows weather from 12 p.m. to 6 p.m., in which the weather may be the same or similar. The section 1316 shows weather from 6 p.m. to 12 a.m., in which the weather may be the same or similar.

The controller 180 can display a second user interface 1320 including a roll image formed in 3D spherical shape by rolling the image displayed on the first user interface 1310. Eight sections 1311, 1312, 1313, 1314, 1315, and 1316 displayed on the second user interface 1320 may be the eight sections displayed on the first user interface 1310. For example, the parts showing weather in the original image on the first user interface 1310 are expressed as the background and the parts showing weather are the outside of the sphere in the roll image on the second user interface 1320. Though not shown in the figure, the second user interface 1320 may further include a return button for returning to an original image, an edit button for editing a roll image, a storing button for storing a roll image, and a sharing button for sharing a roll image.

Referring to FIG. 13, the controller 180 can divide one image into a plurality of sections and display a third user interface 1330 showing weather in each of the divided sections. For example, the sections on the third user interface 1330 may be obtained by dividing an image into seven sections (for example, 1331, 1332, 1333, 1334, 1335, 1336, and 1337) clockwise from the 9 o'clock direction to the 12 o'clock direction when the electronic device 100 is longitudinally positioned. For example, the controller 180 may show weather of a day with colors (or shapes), text, or icons in the divided sections.

For example, the first section 1331 may show the today's weather with a color of gray, text of 2° (for example, morning temperature)/9° (for example, daytime temperature), and an icon of a cloud shape. The second section 1332 may show the weather of Wednesday with a transparent color (or white), text of 3°/9°, and an icon of a sun shape. The third section 1333 may show the weather of Thursday with an opaque color (or a waterdrop pattern), text of 6°/12°, and an icon of a cloud shape and hatching lines. The fourth section 1334 may show the weather of Friday with a color of gray, text of 2°/9°, and an icon of a cloud shape. The fifth section 1335 may show the weather of Saturday with a transparent color (or white), text of 7°/11°, and an icon of a sun shape. The sixth section 1336 may show the weather of Sunday with a color of gray, text of 3°/8°, and an icon of a cloud shape. The seventh section 1337 may show the weather of Monday with an opaque color (or a waterdrop pattern), text of 5°/9°, and an icon of a cloud shape and hatching lines.

Figure 14:
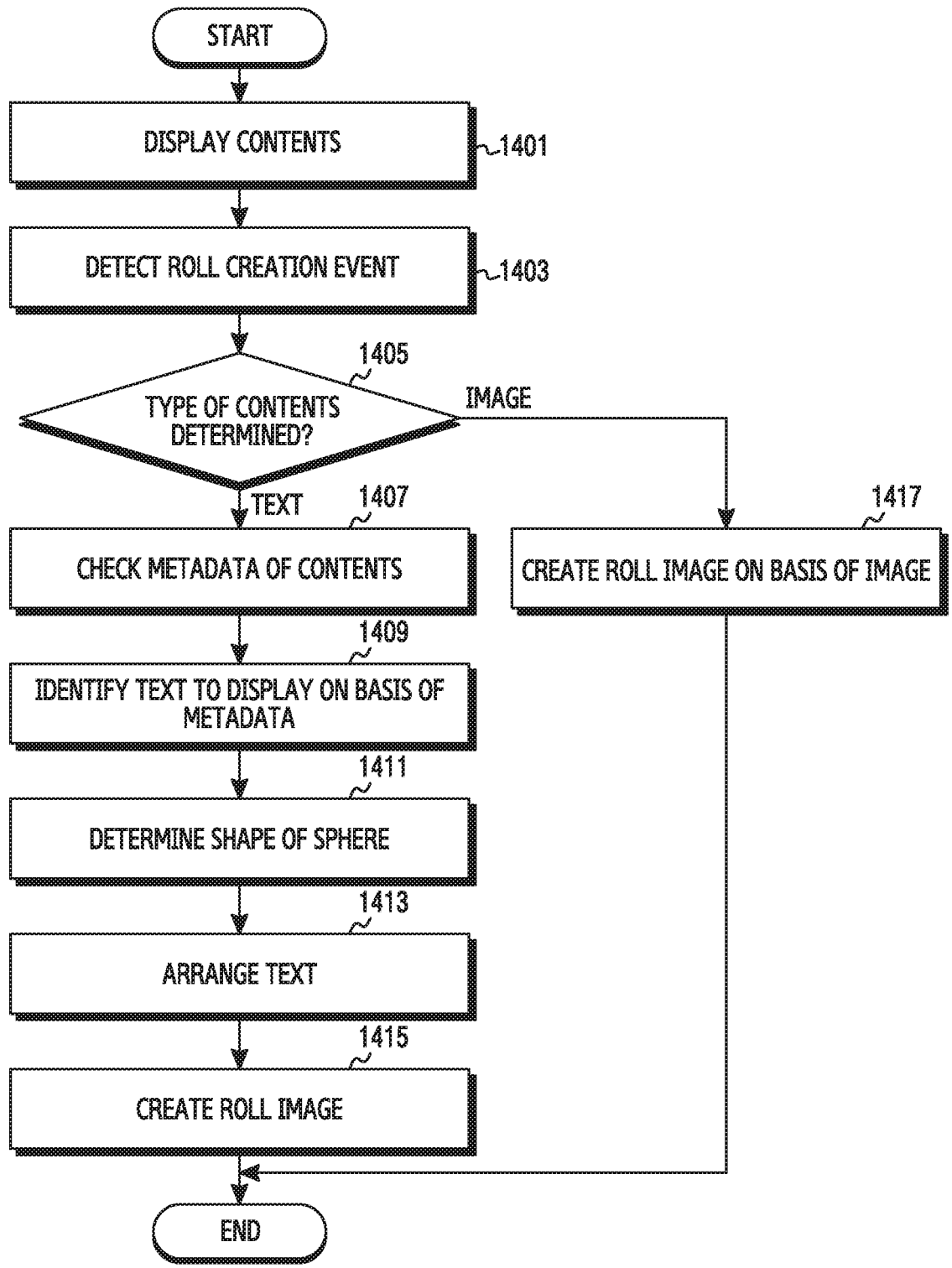
FIG. 14 is a flowchart showing a method of creating a roll image on the basis of text according to various embodiments.

FIG. 14 is a flowchart showing a method of creating a roll image on the basis of text according to various embodiments.

Referring to FIG. 14, in operation 1401, the controller 180 can display contents. For example, the contents may include text, an image, and multimedia data (for example, text and an image).

In operation 1403, the controller 180 can detect a roll creation event. The roll creation event may be for showing the contents displayed in operation 1401 into a roll image. The roll creation event may be selection of a button for creating a roll image by a user or detection of a gesture for creating a roll image.

When the roll creation event is detected, in operation 1405, the controller 180 can determine the type of the contents. The type of contents means the kind of contents and shows whether the contents are text, images, or text and images.

The controller 180 can perform operation 1417 when the type of the contents is an image, it can perform operation 1407 when the type of the contents is text. In operation 1417, the controller 180 can create a roll image of the displayed contents, using an image. For example, the method of creating a roll image on the basis of the image may means the method of creating a roll image described with reference to FIG. 4. In operation 1417, the controller 180 may perform operations 405 to 411 in FIG. 4. For example, the controller 180 can check the size of the contents (for example, an image), identify objects, and determines a boundary line, whereby it can create a roll image, using the size, the objects, or the boundary line.

A method of creating a roll image on the basis of text in operations 1407 to 1415 is described hereafter.

When the type of the contents is text, in operation 1407, the controller 180 can check metadata of the contents. Metadata relates to the properties (for example, tag information) of contents, and for example, may be the size, the number, and the kind of data. The controller 180 can compress a useful statistic value into a circular shape on the basis of the metadata of the contents.

In operation 1409, the controller 180 can identify text to display when creating a roll image on the basis of the metadata. For example, the controller 180 can creates a roll image in a spherical shape and display text on the edge of the sphere or in the sphere. The controller 180 can calculate a statistic value of the contents or identify text to display from the contents on the basis of the metadata.

In operation 1411, the controller 180 can determine a spherical shape when creating a roll image. Unlike when an image-based roll image is created, when a text-based roll image is created, text is displayed on the edge of a sphere, so the shape of the sphere may depend on the number or length of identified text. For example, a sphere is positioned in a start such that the outer side of the edge of the sphere protrudes. Alternatively, a sphere is positioned in a triangle such that the outer side of the edge of the sphere protrudes. Alternatively, a sphere is positioned in a flame shape such that the outer side of the edge of the sphere protrudes. That is, the numbers and shapes of protrusions outside the edge of a sphere may be different.

In operation 1413, the controller 180 may arrange the identified text outside the determined spherical shape. For example, the controller 180 can arrange the identified text on a protrusion of the determined spherical shape.

In operation 1415, the controller 180 can create a roll image. The controller 180 can create a roll image in which the identified text is disposed outside the spherical shape and text for one item of contents is displayed in the spherical shape.

Figure 15A:
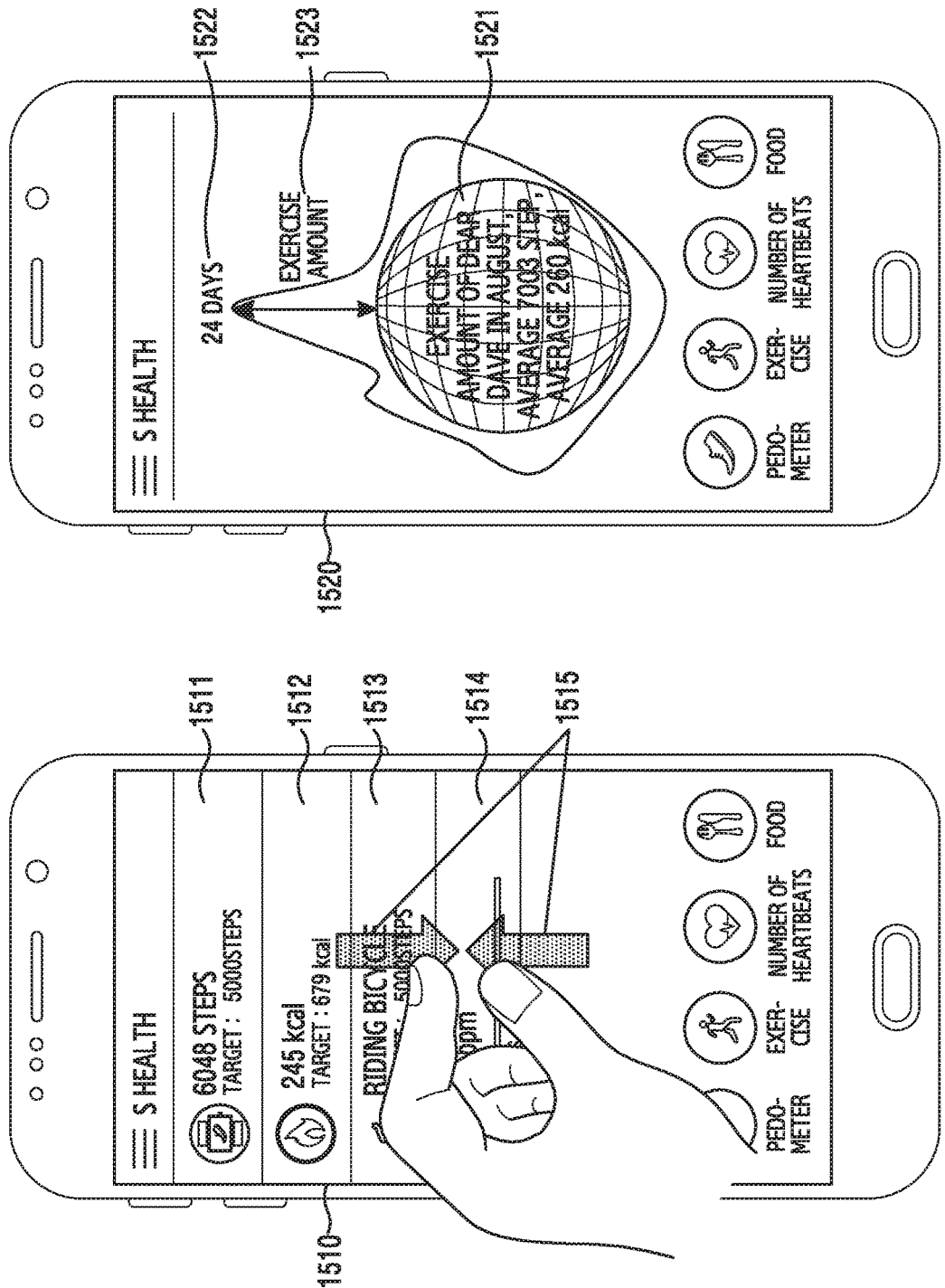
FIGS. 15A and 15B are views showing an example of creating a roll image on the basis of text according to various embodiments.
Figure 15B:
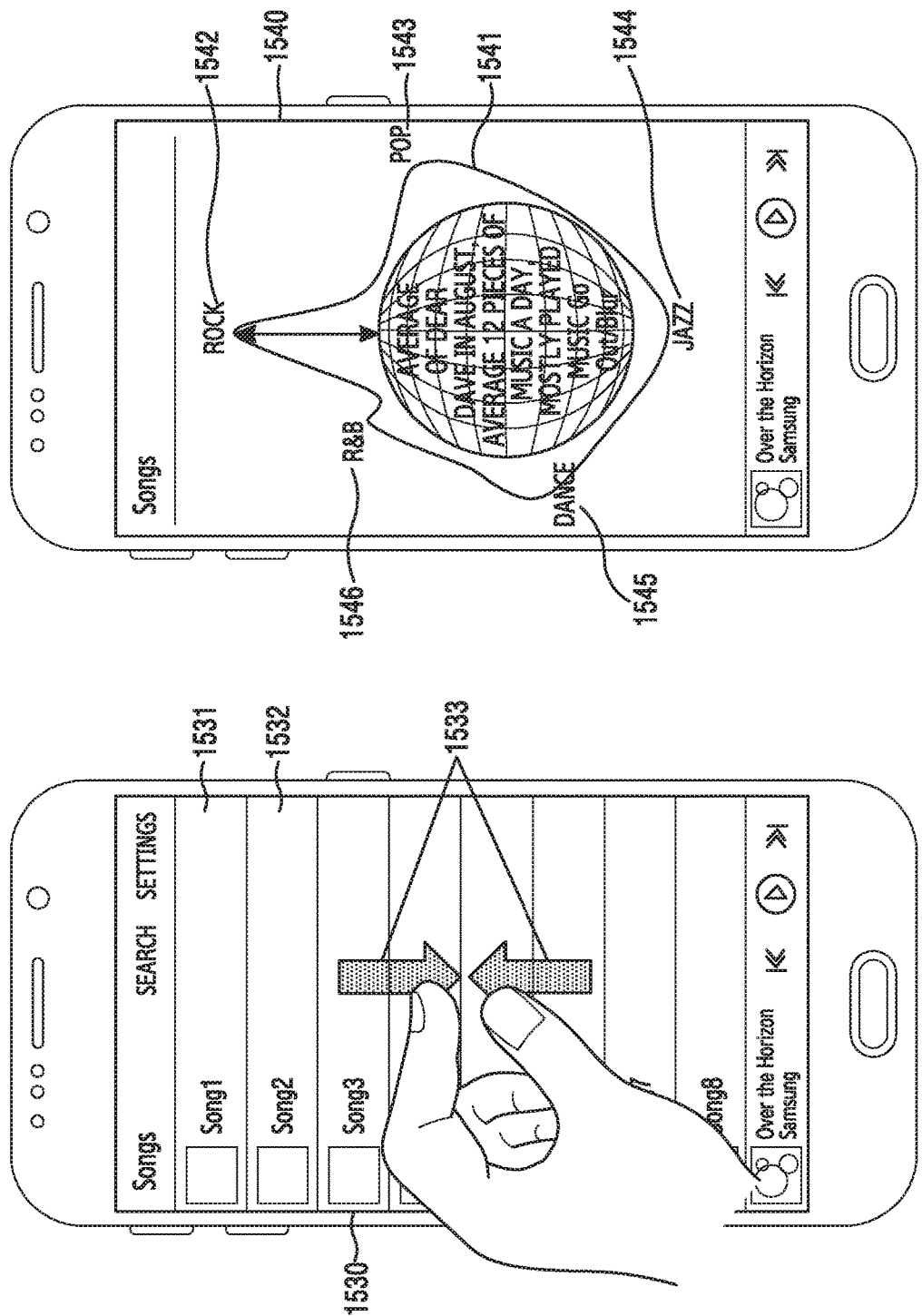

FIGS. 15A and 15B are views showing an example of creating a roll image on the basis of text according to various embodiments.

FIG. 15A shows a first user interface for a health application. Various items of information related to the health of a user for a day (for example, 24 days) may be included in the first user interface 1510. For example, the number of current steps (for example, 6048 steps) and the number of target steps (for example, 5000 steps) 1511, the currently consumed calories (for example, 245 kcal) and target consumed calories (679 kcal) 1512, riding a bicycle 1513, and the number of heartbeats 1514 may be included in the first user interface 1510. The controller 180 can detect a gesture 1515 on the first user interface 1510. The gesture 1515 maybe input by a user closing at least two fingers (for example, pinching or zooming-in). Alternatively, the gesture 1515 may be input by a user opening at least two fingers on the screen (for example, zooming-out or spreading). When the detected gesture 1515 is a roll creation event, the controller 180 can create a roll image on the basis of text in the first user interface 1510.

The controller 180 can display a second user interface 1520 including a roll image 1521 created on the text in the first user interface 1510. The second user interface 1520 may display health information (for example, statistic values (average 7003 steps and average 260 kcal) of a user (for example, Dear Dave) in a sphere and exercise amount 1523 for a day 1522 (for example, 24 days) outside the sphere. The protrusions outside the sphere shape may depend on the exercise amount 1523. That is, the exercise 1523 may graph the health information of the user for a day and the user can know his/her health state only from the roll image 1521. That is, the controller 180 can provide the first user interface 1510 or the second user interface 1520 for the health application, depending on selection by the user.

FIG. 15B shows a first user interface for a music application. A music list may be included in the first user interface 1530. For example, information about eight music files including a song 1 1531 and a song 2 1532 may be displayed on the first user interface 1530. The controller 180 can detect a gesture 1533 on the first user interface 1530. The gesture 1533 maybe input by a user closing at least two fingers (for example, pinching or zooming-in). The gesture 1533 may be input by a user opening at least two fingers on the screen (for example, zooming-out or spreading). When the detected gesture 1533 is a roll creation event, the controller 180 can create a roll image on the basis of text on the first user interface 1530.

According to various embodiments, the controller 180 can create a roll image on the basis of text (for example, eight music files) included in the first user interface 1530 or create a roll image on the basis of all of the text (for example, all of the music files) in the music application.

The controller 180 can display a second user interface 1540 including a roll image 1541 created on the text in the first user interface 1530. The second user interface 1540 can display a statistic value of music (for example, average 12 pieces of music and the most played music 'Go Out/Blur') of a user (for example, Dear Dave) in a sphere and display the genres of music with text (for example, ROCK 1542, POP 1543, JAZZ 1544, DANCE 1545, and R&B 1546) outside the sphere. The controller 180 can change the protrusion outsides the sphere, using the metadata of the music list. For example, the controller 180 can make the protrusion of the genre (for example ROCK 1542) of the most music further protrude than other music genres. For example, the spherical shape graphs the genres of music files and a user can know the statistic value of the music list or his/her music style only from the roll image 1541. That is, the controller 180 can provide the first user interface 1530 or the second user interface 1540 for the music application, depending on selection by the user.

A method of displaying contents of an electronic device according to various embodiments may include: an operation of displaying an original image on a display; an operation of detecting a roll creation event; an operation of identifying objects from the original image in accordance with the roll creation event; and an operation of converting the original image into a roll image, using the identified objects.

The method of displaying contents may further include: an operation of displaying an area setting frame on the displayed image in accordance with the roll creation event; an operation of determining a roll image creation area by moving the position of the area setting frame in accordance with selection by a user; and an operation of identifying objects in the roll image creation area.

The method of displaying contents may further include an operation of determining a boundary line, using the identified object, and the operation of converting the original image into a roll image may include an operation of converting the original image into a roll image, using the objects or the boundary line.

The method of displaying contents may further include an operation of determining the size of the roll image on the basis of at least one of the size of the original image, the objects, and the boundary line.

The operation of converting the original image into a roll image may include: an operation of selecting a representative object on the basis of at least one of the priority of the objects, the sizes of the objects, the properties of the objects, and the properties of the original image; and an operation of creating the roll image on the basis of the representative object.

The operation of converting the original image into a roll image may include: an operation of determining the boundary line on the basis of at least one of a color difference in the original image, the properties of the original image, or the sizes of the objects; and an operation of creating the roll image by displaying a lower area from the boundary line in a 3D spherical or circular shape, displaying an upper portion from the boundary line outside the 3D spherical or circular shape, and arranging the identified objects at the center of the 3D spherical or circular shape.

The method of displaying contents may further include: an operation of determining the kind of an image obtained through a camera module; and operation of determining whether to create a roll image on the basis of the kind of the image.

The objects may include at least one of a subject, a person, a thing, a background, and a natural environment and the roll image may be obtained by displaying the original image in a 3D spherical or circular shape on the basis of the identified objects.

The method of displaying contents may further include: an operation of displaying the roll image on the display; an operation of detecting user input; and an operation of changing the sizes of objects or a sphere in the roll image on the basis of the user input.

The operation of changing the sizes may include an operation of adjusting the size of the sphere when the sizes of the objects are changed on the basis of the user input, and of adjusting the sizes of the objects when the size of the sphere is changed on the basis of the user input.

The method of displaying contents may further include: an operation of searching for a roll image of images stored in the memory when a roll image display event is detected; and an operation of displaying an image list including the found roll image.

The method of displaying contents may further include: an operation of checking metadata of contents displayed on the display; and an operation of creating a roll image by determining text and a spherical shape to display on the basis of the metadata.

The embodiments disclosed in the present specifications and drawings are provided merely to readily describe and to help a thorough understanding of the present disclosure but are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

The invention claimed is:

1. An electronic device comprising:
   a display;
   a memory; and
   at least one processor operatively connected with the display and the memory,
   wherein the at least one processor is configured to:
      control the display to display an original image,
      detect a roll creation event,
      identify objects from the original image in accordance with the roll creation event,
      convert the original image into a roll image by rolling the original image into a 3 dimensional (3D) spherical shape or a circular shape, using the identified objects, and
      store the roll image in the memory,
   wherein the objects include at least one of a subject, a person, a thing, a background, or a natural environment, and
   wherein the roll image is created such that the identified objects in the original image is displayed protruding from the edge of the 3D spherical shape or the circular shape.

2. The electronic device of claim 1, wherein the at least one processor is further configured to:
   control the display to display an area setting frame on the displayed image in accordance with the roll creation event,
   determine a roll image creation area by moving the position of the area setting frame in accordance with selection by a user, and
   identify objects in the roll image creation area.

3. The electronic device of claim 1, wherein the at least one processor is further configured to:
   determine a boundary line, using the identified objects, and
   convert the original image into the roll image, using the objects or the boundary line.

4. The electronic device of claim 3, wherein the at least one processor is further configured to determine a size of the roll image based on at least one of a size of the original image, the objects, or the boundary line.

5. The electronic device of claim 1,
   wherein the at least one processor is further configured to:
      select a representative object based on at least one of priority, sizes, or properties of the objects, and
   wherein the representative object has size discriminated from size of other objects of the original image, in the roll image.

6. The electronic device of claim 1, wherein the at least one processor is further configured to determine the boundary line based on at least one of a color difference in the original image, the properties of the original image, or sizes of the objects.

7. The electronic device of claim 1, further comprising a camera module,
   wherein the at least one processor is further configured to:
      determine a type of an image obtained through the camera module, and
      determine whether to create the roll image based on the type of the image.

8. The electronic device of claim 1,
wherein the at least one processor is further configured to:
identify at least one object from the original image in response to detecting the roll creation event, and
generate the roll image that the identified at least one object is centered, by converting the original image based on the identified at least one object, and
wherein the roll image comprises at least one of a 3D spherical shape image, or a circular shape image.

9. The electronic device of claim 1, wherein the at least one processor is further configured to determine a shape of the roll image based on a length of the original image.

10. The electronic device of claim 1, wherein, in the roll image, a lower area from the boundary line of the original image is shown in the 3D spherical shape or the circular shape, an upper area from the boundary line of the original image is shown as the outside of the 3D spherical shape or the circular shape, and the identified objects are positioned at the center of the 3D spherical shape or the circular shape.

11. The electronic device of claim 1, wherein the at least one processor is further configured to:
control the display to display the roll image,
detect a user input, and
change sizes of the objects or the sphere in the roll image based on the user input.

12. The electronic device of claim 11, wherein the at least one processor is further configured to:
adjust a size of the sphere when the sizes of the objects are changed based on the user input, and
adjust the sizes of the objects when the size of the sphere is changed based on the user input.

13. The electronic device of claim 1, wherein the at least one processor is further configured to:
search for the roll image of images stored in the memory, and
control the display to display an image list including a found roll image when a roll image display event is detected.

14. The electronic device of claim 1, wherein the at least one processor is further configured to create the roll image by:
checking metadata of contents displayed on the display, and
determining text and a spherical shape to display based on the metadata.

15. A method of displaying contents of an electronic device, the method comprising:
displaying an original image on a display;
detecting a roll creation event;
identifying objects from the original image in accordance with the roll creation event; and
converting the original image into a roll image by rolling the original image into a 3 dimensional (3D) spherical shape or a circular shape, using the identified objects,
wherein the objects include at least one of a subject, a person, a thing, a background, and a natural environment, and
wherein the roll image is created such that the identified objects in the original image is displayed from the edge of the 3D spherical shape or the circular shape.

16. The method of claim 15, further comprising:
displaying an area setting frame on the displayed image in accordance with the roll creation event; and
determining a roll image creation area by moving the position of the area setting frame in accordance with selection by a user.

17. The method of claim 15,
wherein the converting of the original image into the roll image comprising:
selecting a representative object based on at least one of priority, sizes, or properties of the objects, and
wherein the representative object has size discriminated from size of other objects of the original image, in the roll image.

18. The method of claim 15, wherein the converting of the original image into the roll image comprising:
determining the boundary line based on at least one of a color difference in the original image, the properties of the original image, or the sizes of the objects; and
creating the roll image by using a lower area and upper area of the original image based on the boundary line.

19. The method of claim 15, further comprising:
determining a type of an image obtained through a camera module; and
determining whether to create the roll image based on the type of the image.

20. The method of claim 15, further comprising identifying at least one object from the original image in response to detecting the roll creation event, and generate the roll image that the identified at least one object is centered, by converting the original image based on the identified at least one object,
wherein the roll image comprises at least one of a 3D spherical shape image, or a circular shape image.

* * * * *